United States Patent
Campos et al.

(10) Patent No.: US 12,468,269 B2
(45) Date of Patent: Nov. 11, 2025

(54) DETECTION OF DRIVING ACTIONS THAT MITIGATE RISK

(71) Applicant: NETRADYNE, INC., San Diego, CA (US)

(72) Inventors: Michael Campos, La Jolla, CA (US); Anubhav, Bangalore (IN); Venkata Sreekanta Reddy Annapureddy, San Diego, CA (US); Vikram Gupta, Bangalore (IN); Hisham Rahman, Bangalore (IN); Sneha Aenugu, Bangalore (IN); Priyam Bakliwal, Bangalore (IN); Alexander Thomas, Bangalore (IN); Adam David Kahn, San Diego, CA (US); David Jonathan Julian, San Diego, CA (US); Sandeep Pandya, Irvine, CA (US); Avneesh Agrawal, Bangaluru (IN)

(73) Assignee: NETRADYNE, INC., San Diego, CA (US)

( * ) Notice: Subject to any disclaimer, the term of this patent is extended or adjusted under 35 U.S.C. 154(b) by 143 days.

(21) Appl. No.: 17/728,053

(22) Filed: Apr. 25, 2022

(65) Prior Publication Data

US 2022/0253021 A1 Aug. 11, 2022

Related U.S. Application Data

(63) Continuation of application No. 16/948,458, filed on Sep. 18, 2020, now Pat. No. 11,314,209, which is a continuation of application No. 16/702,118, filed on Dec. 3, 2019, now Pat. No. 10,782,654, which is a continuation of application No. PCT/US2018/055631, filed on Oct. 12, 2018.

(Continued)

(51) Int. Cl.
*G05B 13/02* (2006.01)
*B60R 11/04* (2006.01)
*G06V 20/56* (2022.01)
*G06V 20/58* (2022.01)

(52) U.S. Cl.
CPC .............. *G05B 13/027* (2013.01); *B60R 11/04* (2013.01); *G06V 20/58* (2022.01); *G06V 20/588* (2022.01)

(58) Field of Classification Search
None
See application file for complete search history.

(56) References Cited

U.S. PATENT DOCUMENTS

| 5,808,728 A | 9/1998 | Uehara |
| 6,188,329 B1 | 2/2001 | Glier et al. |

(Continued)

FOREIGN PATENT DOCUMENTS

| JP | 2015055921 A | 3/2015 |
| JP | 2017151694 A * | 8/2017 |

(Continued)

OTHER PUBLICATIONS

Extended European Search Report in EP Patent Application No. 178737484.9 dated Jul. 1, 2019 (10 pages).

(Continued)

*Primary Examiner* — Lindsay J Uhl
(74) *Attorney, Agent, or Firm* — Foley & Lardner LLP

(57) ABSTRACT

Systems and methods are provided for detecting a driving action that mitigates risk.

20 Claims, 11 Drawing Sheets

Related U.S. Application Data

(60) Provisional application No. 62/573,120, filed on Oct. 16, 2017, provisional application No. 62/571,617, filed on Oct. 12, 2017.

(56) References Cited

U.S. PATENT DOCUMENTS

| | | | |
|---|---|---|---|
| 6,281,808 B1 | 8/2001 | Glier et al. | |
| 6,768,944 B2 | 7/2004 | Breed et al. | |
| 6,985,827 B2 | 1/2006 | Williams et al. | |
| 7,254,482 B2 | 8/2007 | Kawasaki et al. | |
| 7,825,825 B2 | 11/2010 | Park | |
| 7,957,559 B2 | 6/2011 | Shima et al. | |
| 8,031,062 B2 | 10/2011 | Smith | |
| 8,144,030 B1 | 3/2012 | Lipke | |
| 8,258,982 B2 | 9/2012 | Miura | |
| 8,446,781 B1 | 5/2013 | Rajan et al. | |
| 8,531,520 B2 | 9/2013 | Stricklin et al. | |
| 8,560,164 B2 | 10/2013 | Nielsen et al. | |
| 8,645,535 B1 | 2/2014 | Martini | |
| 8,676,492 B2 | 3/2014 | Litkouhi et al. | |
| 8,773,281 B2 | 7/2014 | Ghazarian | |
| 8,855,904 B1 | 10/2014 | Templeton et al. | |
| 8,912,016 B2 | 12/2014 | Godo et al. | |
| 8,972,076 B2 | 3/2015 | Ogawa | |
| 9,047,773 B2 | 6/2015 | Chen et al. | |
| 9,081,650 B1 | 7/2015 | Brinkmann et al. | |
| 9,104,535 B1 | 8/2015 | Brinkmann et al. | |
| 9,147,353 B1 * | 9/2015 | Slusar | G08G 1/22 |
| 9,158,980 B1 | 10/2015 | Ferguson et al. | |
| 9,524,269 B1 | 12/2016 | Brinkmann et al. | |
| 9,535,878 B1 | 1/2017 | Brinkmann et al. | |
| 9,558,656 B1 | 1/2017 | Brinkmann et al. | |
| 9,672,734 B1 | 6/2017 | Ratnasingam | |
| 9,834,139 B1 * | 12/2017 | Park | G06F 17/11 |
| 10,004,000 B2 | 6/2018 | Li et al. | |
| 10,029,696 B1 | 7/2018 | Ferguson | |
| 10,053,010 B2 | 8/2018 | Thompson et al. | |
| 10,151,840 B2 | 12/2018 | Itoh et al. | |
| 10,157,423 B1 | 12/2018 | Fields et al. | |
| 10,176,524 B1 | 1/2019 | Brandmaier et al. | |
| 10,192,446 B2 * | 1/2019 | Mueller | B60W 30/16 |
| 10,229,461 B2 | 3/2019 | Akiva et al. | |
| 10,347,127 B2 | 7/2019 | Droz et al. | |
| 10,407,078 B2 | 9/2019 | Ratnasingam | |
| 10,449,967 B1 | 10/2019 | Ferguson | |
| 10,475,338 B1 | 11/2019 | Noel | |
| 10,782,654 B2 | 9/2020 | Campos et al. | |
| 10,796,369 B1 | 10/2020 | Augustine et al. | |
| 10,803,525 B1 | 10/2020 | Augustine et al. | |
| 11,004,000 B1 * | 5/2021 | Gutmann | B60W 30/0956 |
| 11,314,209 B2 * | 4/2022 | Campos | G08G 1/04 |
| 2002/0054210 A1 | 5/2002 | Glier et al. | |
| 2004/0054513 A1 | 3/2004 | Laird et al. | |
| 2004/0101166 A1 | 5/2004 | Williams et al. | |
| 2007/0027583 A1 | 2/2007 | Tamir et al. | |
| 2007/0142995 A1 | 6/2007 | Wotlermann | |
| 2007/0193811 A1 | 8/2007 | Breed et al. | |
| 2008/0130302 A1 | 6/2008 | Watanabe | |
| 2008/0162027 A1 | 7/2008 | Murphy et al. | |
| 2009/0115632 A1 | 5/2009 | Park | |
| 2009/0265069 A1 | 10/2009 | Desbrunes | |
| 2009/0284361 A1 | 11/2009 | Boddie et al. | |
| 2010/0023296 A1 | 1/2010 | Huang et al. | |
| 2010/0033571 A1 | 2/2010 | Fujita et al. | |
| 2010/0045799 A1 | 2/2010 | Lei et al. | |
| 2010/0052883 A1 | 3/2010 | Person | |
| 2010/0073194 A1 | 3/2010 | Ghazarian | |
| 2010/0145600 A1 | 6/2010 | Son et al. | |
| 2010/0157061 A1 | 6/2010 | Katsman et al. | |
| 2010/0198491 A1 | 8/2010 | Mays | |
| 2010/0238262 A1 | 9/2010 | Kurtz et al. | |
| 2011/0071746 A1 | 3/2011 | O'Connor et al. | |
| 2011/0077028 A1 * | 3/2011 | Wilkes, III | G08G 1/052 455/456.3 |
| 2011/0182475 A1 | 7/2011 | Fairfield et al. | |
| 2012/0033896 A1 | 2/2012 | Barrows | |
| 2012/0056756 A1 | 3/2012 | Yester | |
| 2012/0095646 A1 | 4/2012 | Ghazarian | |
| 2012/0179358 A1 | 7/2012 | Chang et al. | |
| 2012/0194357 A1 | 8/2012 | Ciolli | |
| 2012/0288138 A1 | 11/2012 | Zeng | |
| 2013/0096731 A1 * | 4/2013 | Tamari | G06F 11/3058 701/1 |
| 2013/0154854 A1 | 6/2013 | Chen et al. | |
| 2013/0158800 A1 | 6/2013 | Trageser | |
| 2013/0243261 A1 | 9/2013 | Matsuda et al. | |
| 2013/0338914 A1 | 12/2013 | Weiss | |
| 2013/0344859 A1 | 12/2013 | Abramson et al. | |
| 2014/0016826 A1 | 1/2014 | Fairfield et al. | |
| 2014/0032089 A1 | 1/2014 | Aoude et al. | |
| 2014/0114526 A1 | 4/2014 | Erb | |
| 2014/0122392 A1 | 5/2014 | Nicholson et al. | |
| 2014/0236414 A1 | 8/2014 | Droz et al. | |
| 2015/0025784 A1 | 1/2015 | Kastner et al. | |
| 2015/0039175 A1 | 2/2015 | Martin et al. | |
| 2015/0039350 A1 | 2/2015 | Martin et al. | |
| 2015/0105989 A1 | 4/2015 | Lueke et al. | |
| 2015/0112504 A1 | 4/2015 | Binion et al. | |
| 2015/0170002 A1 | 6/2015 | Szegedy et al. | |
| 2015/0175168 A1 | 6/2015 | Hoye et al. | |
| 2015/0178578 A1 | 6/2015 | Hampiholi et al. | |
| 2015/0178998 A1 | 6/2015 | Attard et al. | |
| 2015/0193885 A1 | 7/2015 | Akiva et al. | |
| 2015/0194035 A1 | 7/2015 | Akiva et al. | |
| 2015/0210274 A1 | 7/2015 | Clarke et al. | |
| 2015/0222859 A1 | 8/2015 | Schweid et al. | |
| 2015/0235093 A1 | 8/2015 | Shima et al. | |
| 2015/0248836 A1 | 9/2015 | Alselimi | |
| 2015/0281305 A1 | 10/2015 | Sievert et al. | |
| 2015/0293534 A1 | 10/2015 | Takamatsu et al. | |
| 2015/0329045 A1 | 11/2015 | Harris | |
| 2015/0332590 A1 | 11/2015 | Salomonsson et al. | |
| 2015/0336547 A1 | 11/2015 | Dagan et al. | |
| 2015/0379869 A1 | 12/2015 | Ferguson et al. | |
| 2016/0027292 A1 | 1/2016 | Kerning et al. | |
| 2016/0035223 A1 | 2/2016 | Gutmann et al. | |
| 2016/0101732 A1 | 4/2016 | Danz | |
| 2016/0140438 A1 | 5/2016 | Yang et al. | |
| 2016/0150070 A1 | 5/2016 | Goren et al. | |
| 2016/0176358 A1 | 6/2016 | Raghu et al. | |
| 2016/0176397 A1 | 6/2016 | Prokhorov et al. | |
| 2016/0180707 A1 | 6/2016 | Macneille et al. | |
| 2016/0187487 A1 | 6/2016 | Itoh et al. | |
| 2016/0203719 A1 | 7/2016 | Divekar et al. | |
| 2016/0343254 A1 | 11/2016 | Rovik et al. | |
| 2016/0358477 A1 | 12/2016 | Ansari et al. | |
| 2017/0015318 A1 | 1/2017 | Scofield et al. | |
| 2017/0021863 A1 | 1/2017 | Thompson et al. | |
| 2017/0036673 A1 | 2/2017 | Lee et al. | |
| 2017/0080853 A1 | 3/2017 | Raghu et al. | |
| 2017/0086050 A1 | 3/2017 | Kerning et al. | |
| 2017/0097243 A1 | 4/2017 | Ricci | |
| 2017/0113665 A1 | 4/2017 | Mudalige et al. | |
| 2017/0116485 A1 | 4/2017 | Mullen | |
| 2017/0174261 A1 | 6/2017 | Micks et al. | |
| 2017/0200061 A1 | 7/2017 | Julian et al. | |
| 2017/0200063 A1 | 7/2017 | Nariyambut et al. | |
| 2017/0206434 A1 | 7/2017 | Nariyambut et al. | |
| 2017/0217430 A1 | 8/2017 | Sherony et al. | |
| 2017/0230563 A1 | 8/2017 | Satou et al. | |
| 2017/0243073 A1 | 8/2017 | Raghu et al. | |
| 2017/0261991 A1 | 9/2017 | Raghu et al. | |
| 2017/0279957 A1 | 9/2017 | Abramson et al. | |
| 2017/0305434 A1 | 10/2017 | Ratnasingam et al. | |
| 2018/0003965 A1 | 1/2018 | O'toole et al. | |
| 2018/0017799 A1 | 1/2018 | Ahmad et al. | |
| 2018/0018869 A1 | 1/2018 | Ahmad et al. | |
| 2018/0120859 A1 | 5/2018 | Eagelberg et al. | |
| 2018/0253963 A1 | 9/2018 | Azevedo | |
| 2018/0300567 A1 | 10/2018 | Qin et al. | |
| 2018/0321686 A1 | 11/2018 | Kanzawa et al. | |
| 2019/0005812 A1 | 1/2019 | Matus et al. | |
| 2019/0031088 A1 | 1/2019 | Hiramatsu et al. | |

(56) References Cited

U.S. PATENT DOCUMENTS

| | | | |
|---|---|---|---|
| 2019/0122559 A1* | 4/2019 | Zhang | G08G 1/167 |
| 2019/0369637 A1 | 12/2019 | Shalev-Shwartz et al. | |
| 2019/0377354 A1 | 12/2019 | Shalev-Shwartz et al. | |

FOREIGN PATENT DOCUMENTS

| | | | |
|---|---|---|---|
| KR | 10-2014-0080105 | * | 12/2012 |
| KR | 20140080105 A | | 6/2014 |
| KR | 1020140080105 A | | 6/2014 |
| WO | 2017123665 A1 | | 7/2017 |
| WO | 2017165627 A1 | | 9/2017 |

OTHER PUBLICATIONS

Extended European Search Report in EP Patent Application No. 18863528.8 dated Oct. 30, 2020 (9 pages).

Extended European Search Report in EP Patent Application No. 18866299.3 dated Oct. 23, 2020, 9 pages.

First Examination Report in IN Patent Application No. 20187030012 dated May 31, 2021 (8 pages).

Hou et al., "Tube Convolutional Neural Network (T-CNN) for Action Detection in Videos," Computer Vision Foundation, DOI: 10.1109/ICCV.2017.620, retrieved Jan. 17, 2019 from URL: https://arxiv.org/pdf/1703.10664.pdf (10 pages).

Hunter, et al., "The path inference filter: model-based low-latency map matching of probe vehicle data,", Algorithmic Foundations of Robotics X, Jun. 20, 2012, arXiv:1109.1966v2, retrieved from URL: https://arxiv.org/pdf/1109.1996.pdf (23 pages).

International Preliminary Report on Patentability in International Patent Application No. PCT/US2017/013062 dated Mar. 30, 2017 (8 pages).

International Preliminary Report on Patentability in International Patent Application No. PCT/US2017/044755 dated Sep. 30, 2018 (33 pages).

International Preliminary Report on Patentability in International Patent Application No. PCT/US2018/055631 dated Apr. 14, 2020 (5 pages).

International Search Report and Written Opinion in International Patent Application No. PCT/US2018/053636 dated Dec. 7, 2018 (12 pages).

International Search Report and Written Opinion in International Patent Application No. PCT/US2017/044755 dated Oct. 17, 2017 (10 pages).

International Search Report and Written Opinion in International Patent Application No. PCT/US2017/13062 dated Mar. 30, 2017 (9 pages).

International Search Report and Written Opinion in International Patent Application No. PCT/US2018/055631 dated Jan. 4, 2019 (6 pages).

Extended European Search Report in EP Patent Application No. 23203631.9 dated Jan. 26, 2024, 7 pages.

\* cited by examiner

DETECTION OF DRIVING ACTIONS THAT MITIGATE RISK

CROSS-REFERENCE TO RELATED APPLICATION

This application is a continuation of U.S. patent application Ser. No. 16/948,458, filed on the Sep. 18, 2020, which is a continuation of U.S. patent application Ser. No. 16/702,118 filed on the Dec. 3, 2019, and titled "DETECTION OF DRIVING ACTIONS THAT MITIGATE RISK," which is a continuation of and claims priority to PCT/US2018/55631, filed on the Oct. 12, 2018, and titled "DETECTION OF DRIVING ACTIONS THAT MITIGATE RISK," which claims the benefit of U.S. Provisional Patent Application No. 62/571,617 filed on the Oct. 12, 2017, and titled, "SYSTEM AND METHODS OF GENERATING A TRAFFIC INCIDENT REPORT", and U.S. Provisional Patent Application No. 62/573,120 filed on the Oct. 16, 2017, and titled, "DETECTION OF DRIVING ACTIONS THAT MITIGATE RISK," the disclosures of which are expressly incorporated by reference in their entireties.

BACKGROUND

Field

Certain aspects of the present disclosure generally relate to intelligent driving monitoring systems (IDMS), driver monitoring systems, advanced driver assistance systems (ADAS), and autonomous driving systems, and more particularly to systems and methods for detecting driving actions that mitigate risk and systems and methods for the detection of driving actions that mitigate risk.

Background

Vehicles, such as automobiles, trucks, tractors, motorcycles, bicycles, airplanes, drones, ships, boats, submarines, and others, are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

Drivers may sometimes drive unsafely or inefficiently. Unsafe driving behavior may endanger the driver and other drivers and may risk damaging the vehicle. Unsafe driving behaviors may also lead to fines. For example, highway patrol officers may issue a citation for speeding. Unsafe driving behavior may also lead to accidents, which may cause physical harm, and which may, in turn, lead to an increase in insurance rates for operating a vehicle. Inefficient driving, which may include hard accelerations, may increase the costs associated with operating a vehicle.

Driving behavior may be monitored. Driver monitoring may be done in real-time as the driver operates a vehicle, or may be done at a later time based on recorded data. Driver monitoring at a later time may be useful, for example, when investigating the cause of an accident. Driver monitoring in real-time may be useful to guard against unsafe driving, for example, by ensuring that a car cannot exceed a certain pre-determined speed. The types of monitoring available today, however, may be based on sensors that do not provide context to a traffic event. For example, an accelerometer may be used to detect a sudden deceleration associated with a hard-stopping event, but the accelerometer may not be aware of the cause of the hard-stopping event.

Prior approaches to driver monitoring may be based on the occurrence of negative driving events, such as hard-braking or speeding, and may not consider positive measures, such as determinations that a driver's behavior contributed to the avoidance of an unsafe traffic situation. Accordingly, certain aspects of the present disclosure are directed to detecting positive driving actions, such as driving actions that mitigate risk.

SUMMARY

Certain aspects of the present disclosure generally relate to providing, implementing, and using a method of detecting driving actions that mitigate risk. The methods may involve a camera sensor and/or inertial sensors to detect traffic events, as well analytical methods that may determine an action by a monitored driver that is responsive to the detected traffic event.

Certain aspects of the present disclosure provide a system. The system generally includes a memory and a processor coupled to the memory. The processor is configured to: determine an occurrence of an atypical traffic event at or near a monitored vehicle; and determine an action responsive to the atypical traffic event by a driver or a control system of the monitored vehicle based on data collected at the monitored vehicle.

Certain aspects of the present disclosure provide a non-transitory computer readable medium having instructions stored thereon. Upon execution, the instructions cause the computing device to perform operations comprising: determining an occurrence of an atypical traffic event at or near a monitored vehicle; and determining an action responsive to the atypical traffic event by a driver or a control system of the monitored vehicle based on data collected at the monitored vehicle.

Certain aspects of the present disclosure provide a method. The method generally includes determining, by a processor of a computing device, an occurrence of an atypical traffic event at or near a monitored vehicle; and determining, by the processor, an action responsive to the atypical traffic event by a driver or a control system of the monitored vehicle based on data collected at the monitored vehicle.

DETAILED DESCRIPTION

Figure 1:
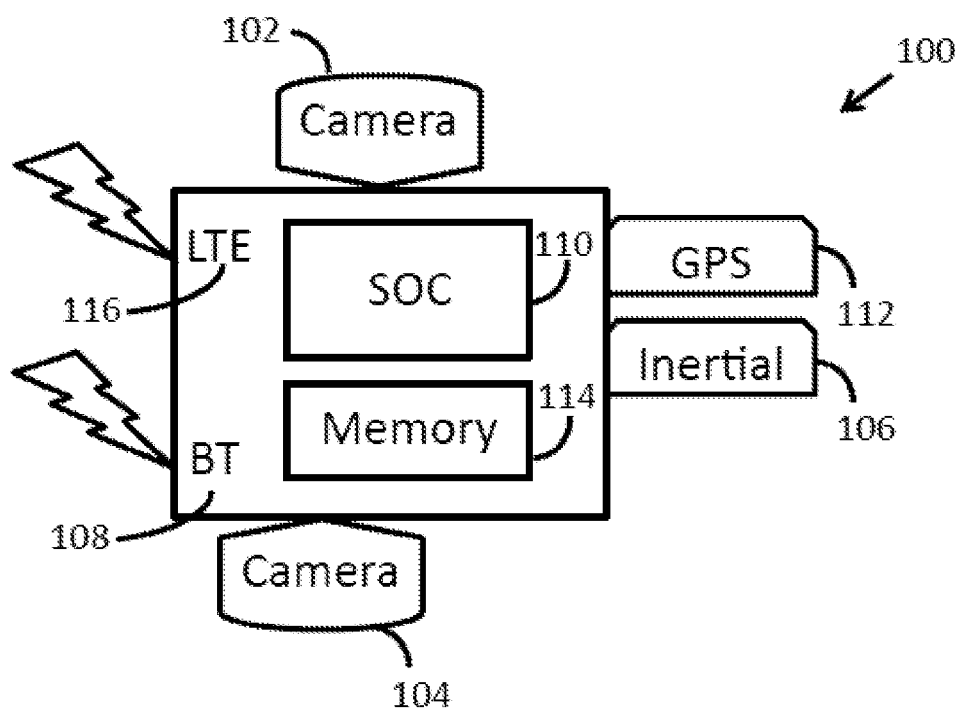
FIG. 1 illustrates an example of a system for detecting a driving action that mitigates risk in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Monitoring and Characterization of Driver Behavior

Aspects of the present disclosure are directed to methods of monitoring and characterizing driver behavior, which may include methods of detecting a driving action that mitigates risk. An accurate characterization of driver behavior has multiple applications. Insurance companies may desire aggregated driver behavior data to influence premiums. Insurance companies, fleet managers, and the like, may seek to reward safe driving behavior and dis-incentivize unsafe driving behaviors, for example, as a means to reducing the number of loss events across a population of drivers. In addition, it may be desirable to reward driving behaviors that avoid or ameliorate the occurrence of unsafe driving scenarios. Furthermore, fleet owners might desire a system capable of classifying driver behaviors as a part of a program to incentivize their drivers to drive safely and efficiently. Taxi aggregators may desire a driver monitoring system as part of a program to incentivize taxi driver behavior, and/or taxi or ride-sharing aggregator customers may desire access to past characterizations of driver behavior. With knowledge of driver behavior, customers may filter and/or select drivers based on driver behavior criteria. For example, to ensure safety, drivers of children or other vulnerable populations may be screened based on driving behavior exhibited in the past. Parents may desire to monitor the driving patterns of their kids and may further utilize methods of monitoring and characterizing driver behavior to incentivize safe driving behavior.

In addition to human drivers, machine controllers are increasingly being used to drive vehicles. Self-driving cars, for example, may include a machine controller (which may be referred to as a computerized driving controller) that interprets sensory inputs and issues control signals to the car so that the car may be driven without a human driver or with minimal human intervention. As with human drivers, machine controllers may also exhibit unsafe or inefficient driving behaviors. Information relating to the driving behavior of a self-driving car would be of interest to engineers attempting to perfect the self-driving car's controller, to law-makers considering policies relating to self-driving cars, and to other interested parties.

Visual information may improve existing ways or enable new ways of monitoring and characterizing driver behavior. For example, according to aspects of the present disclosure, the visual environment around a driver may inform a characterization of driver behavior. Typically, running a red light may be considered an unsafe driving behavior. In some contexts, however, such as when a traffic guard is standing at an intersection and using hand gestures to instruct a driver to move through a red light, driving through a red light would be considered a safe and/or compliant driving behavior. Additionally, in some contexts, an unsafe driving behavior, such as tailgating, may not be the fault of the driver. For example, another driver may have pulled into the driver's lane at an unsafe distance ahead of the driver. Visual information may also improve the quality of a characterization that may be based on other forms of sensor data, such as determining a safe driving speed, as described below.

The costs of accurately characterizing driver behavior on an enabled device that is coupled to the driver's vehicle, using computer vision methods in accordance with certain aspects of the present disclosure, may be less than the costs of alternative methods that use human inspection of visual data. Camera based methods may have lower hardware costs compared with methods that involve RADAR or LiDAR. Still, methods that use RADAR or LiDAR are also contemplated for determination of cause of traffic events, either alone or in combination with a vision sensor, in accordance with certain aspects of the present disclosure.

FIG. 1 illustrates an embodiment of the aforementioned system for detecting a driving action that mitigates risk. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system for detecting a driving action that mitigates risk may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112, or integrated within a System-on-a-chip 110. The device may further include memory storage 114.

A system for detecting a driving action that mitigates risk, in accordance with certain aspects of the present disclosure, may assess the driver's behavior in real-time. For example, an in-car monitoring system, such as the device 100 illustrated in FIG. 1 that may be mounted to a car, may perform analysis in support of a driver behavior assessment in real-time, may determine cause of traffic events as they occur, and may recognize that a driver's action was responsive to an existing or pending traffic situation that served to reduce risk. In this example, the system, in comparison with a system that does not include real-time processing, may avoid storing large amounts of sensor data since it may instead store a processed and reduced set of the data. Similarly, or in addition, the system may incur fewer costs associated with wirelessly transmitting data to a remote server.

Figure 2:
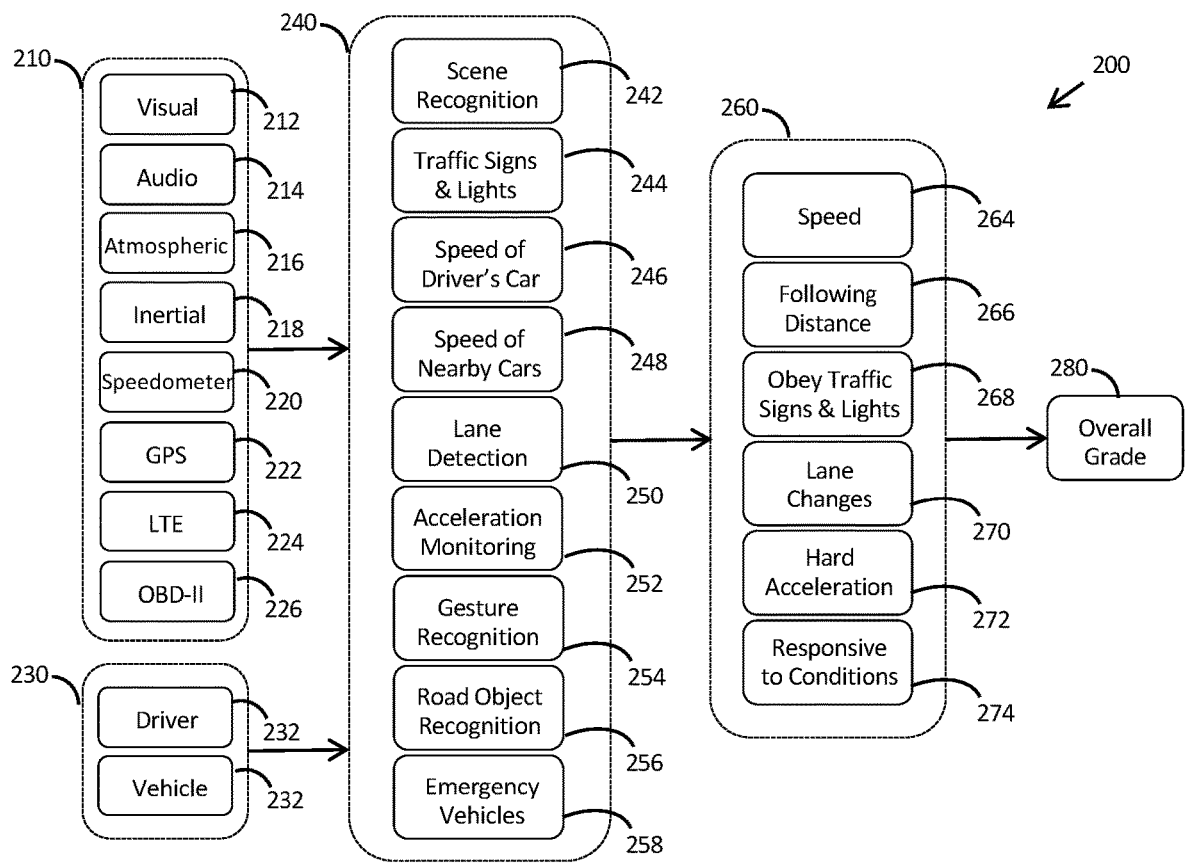
FIG. 2 illustrates an example of a driver monitoring system in accordance with certain aspects of the present disclosure.

A system for detecting a driving action that mitigates risk, in accordance with certain aspects of the present disclosure, may assess the driver's behavior in several contexts and perhaps using several metrics. FIG. 2 illustrates a system of driver monitoring, which may include a system for detecting a driving action that mitigates risk, in accordance with aspects of the present disclosure. The system may include sensors 210, profiles 230, sensory recognition and monitoring modules 240, assessment modules 260, and may produce an overall grade 280. Contemplated driver assessment modules include speed assessment 262, safe following distance 264, obeying traffic signs and lights 266, safe lane changes and lane position 268, hard accelerations including turns 270, responding to traffic officers, responding to road conditions 272, and responding to emergency vehicles. Each of these exemplary features is described in PCT application PCT/US17/13062, entitled "DRIVER BEHAVIOR MONITORING", filed 11 Jan. 2017, which is incorporated herein by reference in its entirety. The present disclosure is not so limiting, however. Many other features of driving behavior may be monitored, assessed, and characterized in accordance with the present disclosure.

Safe Following Distance

Aspects of the present disclosure are directed to visually measuring a following distance 264, which is a distance to a vehicle directly in front of a driver's car. Several methods of visually measuring the following distance are contemplated. For example, a mono-camera 102 may be used to identify the type of vehicle being followed, such as a sedan, van, or semi-truck. In this example, the following distance may be based on feature sizes, such as width, or the relative feature sizes of multiple features associated with each type of vehicle. In another example, a machine learning model, such as a deep neural network, may be used to determine the distance based on the input pixels corresponding to the vehicle ahead. While the preceding examples utilize a mono-camera, the present disclosure is not so limiting. In another example, multiple cameras and/or other sensors, such as RADAR, Ultrasound (SONAR), or LiDAR, may be used to determine the distance to the vehicle ahead. In addition, multiple methods may be combined to estimate the distance.

In an embodiment of the present disclosure, a driver monitoring system may determine the speed of the driver's vehicle 246 and the speed of the vehicle ahead 248. The system may then assess the driver's safe following behavior 264, and determine a safe following grade as a function of the distance to the car and the speeds of the vehicles. In addition, the system may further determine the speed of other traffic 248 and may incorporate the speed of other traffic in the assessment of the driver's safe following behavior 268.

In another embodiment of the aforementioned driver monitoring system, the determined following distance may be converted from a unit of distance, such as from feet or meters, to a unit of time, such as seconds. In this example, the assessment of safe following behavior 264 may be based on this inferred measure of following time. The driver grade for safe following behavior may be computed as a function of the following distance in time, and may also be based on the estimated stopping time based on the current speed of the car 246. For example, driving with less than 0.7 seconds following time while travelling 30 MPH, or driving with less than 1 second following time while travelling 65 MPH may result in a reduction in the driver's safe following grade. Other threshold values may be used depending on the safety and/or fuel efficiency goals of a driver. Threshold values may be set, for example, by a safety manager of a vehicle fleet. For example, a system may be configured such that driving with less than 2 seconds following time while travelling 30 MPH, or driving with less than 5 seconds following time while travelling 65 MPH may result in a reduction in the driver's safe following grade. Safe following thresholds may also be based, at least in part, on weather conditions, posted speed limits, or customary speeds and/or following distances for a given road and/or for a given region.

In the present example, a method of determining the following distance in accordance with the present disclosure may involve a computer vision model. For example, the determination of following distance may involve recognizing the type of vehicle ahead along with the make and model of the vehicle, determining dimensions of the vehicle based on the make and model, computing the observed dimensions of the vehicle (e.g. in pixel coordinates), and estimating the distance based on the relationship between the observed dimensions in the visual data and known vehicle dimensions in real-world coordinates. Similarly, a computer vision model may be based on the detection of the vehicle without recognizing the make and model of the vehicle, and estimating the distance based on a relationship between the observed and known average or median vehicle dimensions of that type. Alternatively, a neural network, such as a deep neural network, may be trained on a set of distance estimates associated with stored sensor inputs. A neural network trained on such inputs may then output an estimate of following distance to a detected car based on a new set of inputs.

Safe Lane Changes and Lane Position

Aspects of the present disclosure may be directed to assessing the quality of lane changes and lane position 268. For example, the driver monitoring system may use either visual 212, RADAR, LiDAR, or other systems 210 to determine the relative positions of vehicles around the car. The driver monitoring system may then assess the driver's aptitude in maintaining a safe location, such as not driving next to cars in adjacent lanes, but rather maintaining an offset in position. During lane changes, the driver monitoring system may assess a characteristic of the driver's driving behavior (such as ability, safety, and the like) based on the relative distances and speeds of the driver's car 246 and nearby cars 248 when changing lanes. In addition, this assessment may be based on whether and when the driver signaled lane changes, which may be accessed via the OBD-II 226, and/or with the aid of a microphone that can detect and recognize the sound of a turn signal indicator.

The driver monitoring system may also determine the rate of closure of cars in adjacent lanes and use that rate of closure to modify the driver assessment. For example, if a driver changed into a lane with a fast approaching car, the distance threshold for a safe assessment of the lane change may be greater than it would have been if the approaching car were going about the same speed as the driver's car.

In another example, a monitored driver may notice that a second car is about to change lanes into his lane, and based on his experience, may know that when the second driver's lane change is completed, the following distance between the monitored driver's car and the second car will be dangerously short. This may create a scenario in which the ability of the monitored driver to react with enough time to avoid a collision may be reduced, which may be critical if traffic flow were to stop suddenly or the vehicle in front of the monitored driver were to stop or suddenly slow.

In accordance with certain aspects of the present disclosure, a system may determine a dangerously short following distance is likely to occur in the near future. The system may then detect whether the driver makes any action that is responsive to this predicted event. In this example, the monitored driver may slow down or change lanes and thereby increase the distance between himself and the second car.

In some embodiments of the present disclosure, a system or method may assess the risk of the driving environment after the driver performed a responsive action. The assessed risk may then be compared with a risk assessment of the driving environment before the driver performed the action. Alternatively, or in addition, the assessed risk may be compared with a risk assessment of the driving environment that the system predicts would have occurred had the driver not performed the action.

In the present example, the monitored driver may have deaccelerated before the second car entered his lane. In this case, the risk level before the driver's action may actually be lower than the risk level after the driver's action, since the monitored driver may be tailgating the second driver shortly after his responsive action, but not before. For this reason, it may be more informative to compare a driving environment risk after the driver's action with a level of risk that would have occurred had the driver not performed the action. In this example, if the driver had not deaccelerated, the following distance would have been even less, and the driving environment correspondingly riskier. Additional examples of tailgating-type events, including avoided tailgating events, and responsive actions are described below.

Based on a determination that a driver's action mitigated risk in the driving environment, a system or method in accordance with the present disclosure may generate an alert notification. In one example, data may be communicated from a device coupled to the monitored driver's vehicle to a second device. The communicated data may include an inference that the driver performed an action that mitigated risk. In some embodiments, the cloud server may then automatically request additional data, such as video data, from the device. The additional data may be used to recognize the driver's proactive driving, may be used as a training video for other driver's, may be used to train an autonomous driving system, and the like. The communicated data may be referred to as a "StarAlert", a DriverStar, and the like. In some embodiments, a "StarAlert" may comprise data requested by a cloud server.

A 'StarAlert' or DriverStar may include an identification of the driver creating space between his vehicle and the vehicle directly in front of his vehicle. In one example, the system may determine that a second vehicle is about to enter the driver's lane from a merging lane of a highway. The determination may be based on detectable attributes of lane lines and/or road boundaries, such as the presence of a dotted lane line pattern, the termination of such a lane pattern, or a curve in a road boundary indicative of the end of a merging zone. In addition, or alternatively, the system may determine that the second vehicle is about to enter the driver's lane because the system is operating on data within a temporal buffer of several seconds (e.g. 10 seconds), and because a separate processing thread has determined that the second vehicle did in fact enter the driver's lane a few seconds ahead of the time of interest. The system may then determine if the monitored driver exhibited any proactive behaviors in response to the merging driver. For example, the driver's vehicle may have slowed by 5 mph within a period leading up to or just after the second vehicle entered his lane. Furthermore, the system may determine that the distance between the driver's vehicle and the second vehicle has increased around the same time, such that a tailgating event was substantially avoided. Such a proactive driving maneuver may be automatically detected. In some embodiments, the driving maneuver just described may be referred to as a "Driver Star—Create Separation", reflecting the outcome of the driver's reduction in speed—which was to create additional separation between the monitored driver and the merging vehicle The driver may have performed one or more of a number of driving actions to generate a "StarAlert". The responsive driving action could be a combination of one or more of the following; reduced speed, reduced relative speed to corresponding traffic, deactivation of throttle, or activation of brake pedal. Each of these actions, alone or in combination, may correspond to the monitored driver taking a proactive driving action to mitigate the risky driving condition unfolding before him.

Advanced Path Prediction

Certain aspects of the present disclosure may include Advanced Path Prediction (APP). Systems and methods of advanced path prediction are described in PCT application PCT/US17/23781—"Advanced Path Prediction", filed 23 Mar. 2017, which is incorporated herein by reference in its entirety. According to certain aspects, the path of travel may be mapped to a camera view, and/or may incorporate information from later points in time.

APP may be applied to systems that determine driving behaviors in response to objects in the environment. Tailgating, for example, is a driving behavior in which a Driver drives at an unsafe distance behind the car ahead of it in the same lane. Since a determination of tailgating behavior depends on a determination of the lane occupied by each of two cars, a method for determining a lane of travel may be desirable for a system for detecting a driving action that mitigates risk. A driving monitoring system with robust lane detection, for example, may be able to properly ignore situations that may appear to be tailgating but in which the car ahead is actually in a different lane, which might be the case on a curved road having multiple lanes of traffic.

Given the determined object locations and determined future path of travel, either estimated or measured and projected, it may be desirable to determine interactions between the determined path and the detected objects. Approaches that estimate a path of travel or measure the future path of travel may assume a path width based on either a typical lane width, such as 3.7 m, or based on the measured or estimated typical width of the ego-car. Additionally, the future path may use lane estimation so that when lane markings are present the width and shift of the lane markings may be adaptively matched up to the computed or estimated future path of travel. In this example, when the vehicle travels in areas where the lane tracking algorithm temporary loses track, such as in areas with lighting variations from overpasses, or areas facing toward the sun at sunrise/sunset, or fresh pavement where lane markings have not yet been added, the path of travel alone may determine the lanes. Still, the determined location and width of the lanes may be more accurate due to the recent prior interaction with the lane detection algorithm. In some embodiments, a system may measure the offset from the center of the lane and the width of a lane. In some embodiments, the lane detection system may include a tracking algorithm such as a Kalman Filter.

Atypical Traffic Events

Disclosed herein are methods and systems for determining the causes of traffic events. In particular, this disclosure focuses on determining the causes of atypical traffic events and/or driver actions that mitigate risk of such event. Although any act or event while driving a vehicle may be characterized as an event, atypical traffic events as described herein are notable because they may lead to some unsafe condition that has a higher probability of leading to an accident. For example, described herein are atypical events that do not occur frequently (e.g. one out of a hundred minutes of driving may contain an atypical event for moderately rare events), but that may lead to unsafe conditions with relatively high frequency once they occur.

The systems and methods disclosed herein may determine whether a driver or control system of a vehicle is the cause of an atypical traffic event, and may further determine whether such an atypical traffic event is actually unsafe. For example, atypical traffic events as disclosed herein may refer to when one vehicle tailgates another or when a red light is run by a vehicle. In certain scenarios, a driver or control system of a vehicle may not be the cause of such atypical events, as disclosed herein. Other atypical traffic events may be related to an inertial event, such as hard braking or accelerating. Other atypical traffic events may be manually input. For example, a traffic guard may report an atypical traffic event that a particular vehicle disregarded an instruction of the traffic guard when passing through an intersection. Accordingly, as used herein, an atypical traffic event can be any event that may be unsafe that may have been caused by a driver or control system of a monitored vehicle. When the systems and methods disclosed herein determine that a driver or control system of a vehicle was not the cause of an atypical traffic event, the driver or control system can be said to have performed permitted actions with respect to the traffic event, may be said to have responded appropriately to the traffic event, and the like.

As used herein, a monitored vehicle is a vehicle for which the systems and methods disclosed herein determine causation for atypical traffic events experienced by or at the vehicle. The vehicle may be monitored by systems, sensors, processors, cameras, etc. installed on or in the vehicle. The vehicle may also be monitored by external cameras, sensors, etc. The data collected to monitor a vehicle can be processed by a device in or on the vehicle, or by a remote device, as described herein. A monitored vehicle is any vehicle for which the systems and methods described herein determine causation with respect to atypical traffic events.

In various embodiments, more than one vehicle at a time may be a monitored vehicle. For example, if a monitoring system is installed on a first vehicle, the system may determine that the first vehicle is not the cause of an atypical traffic event. However, it is contemplated herein that the system may also determine that a second vehicle caused an atypical traffic event. In various embodiments, a system may report only that the first vehicle was not the cause of the atypical traffic event, and/or may also report details relating to the second vehicle that caused the atypical traffic event to a remote server or to another device nearby, such as a Wi-Fi enabled hard-drive affixed to a traffic pole.

For example, it may be desirable to collect data on other vehicles on the road, particularly when those vehicles are the cause of atypical traffic events. Such information may be valuable in a number of ways. For example, the system could use the information to avoid certain drivers or vehicle types in the future. In another example, the system may identify a vehicle type or fleet and report that information back to a manager of a fleet or other party associated with a second vehicle. In a specific example, the vehicle monitoring systems disclosed herein may be mounted on semi-trucks. The system may identify that a car serving as a car for hire (e.g., taxi, Uber, Lyft) was the cause of an atypical traffic event observed or experienced by a semi-truck with the driver monitoring system installed on it. That information could be sold, licensed, or otherwise reported back to the party managing the car for hire, such that the information about the car for hire causing an atypical traffic event can be known by the managing party. In this way, data about vehicles or fleets that do not have the systems disclosed herein actually on board may still benefit from enabled devices that are installed elsewhere. Such vehicles like cars for hire may be identified in a number of ways using visual data, such as markings on the car, license plate numbers, stickers in the windows, etc. In another embodiment, a managing party that receives information about its drivers may provide information about its vehicles which can be used to identify those vehicles on the road. In various embodiments, the driver monitoring systems may not be installed on any vehicle, but may still identify and report on atypical traffic events and those who caused them. For example, a driver monitoring system may be installed on a traffic light pole or fixture.

Detecting Driving Actions that Mitigate Risk—Tailgating

A traffic event may be an inertial event (such as a hard-braking event, a fast acceleration, a swerving maneuver, and the like), may be a traffic violation (such as failing to come to a complete stop at a stop sign, running a red light, crossing a double yellow line on a road, and the like), may be defined by a person (such as a fleet safety manager defining a traffic event through the specification of a time and/or place of interest, a Driver indicating that unsafe driving is occurring in his or her vicinity, a traffic officer viewing a video feed remotely, and the like). In one example, a safety officer may specify a traffic event as a period of time when a specified automobile passed through a specific intersection, the specification of which may be based on a report of unsafe driving.

Traffic events may be caused by the ego-driver (who may be the driver being monitored), may be caused by another driver (who may be in the vicinity of the ego-driver), may be caused by something in the environment (such as road debris), or may have an unknown cause. For example, a traffic event may be specified as a time that the ego-driver slammed on the brakes. If the ego-driver slammed on the brakes because another driver suddenly turned left in front of the ego-driver without signaling, then the cause of the traffic event may be assigned to the other driver. If, however, the ego-driver slammed on the brakes so that he could bring his car to a complete stop at a stop sign that had he had failed to notice earlier, but that had been clearly visible for some time, then the cause of the traffic event may be assigned to the ego-driver.

For systems and methods for detecting a driving action that mitigates risk in accordance with certain aspects of the present disclosure, the use of many different types of sensors is contemplated. In the first example above, in which another driver turns left in front of the ego-driver, a windshield mounted camera may be used to identify the other car. Alternatively, or in addition, RADAR and/or LiDAR may be used to identify the other car. The movements of the other car may also be determined through data messages passed directly or indirectly between the ego-driver's car and the other car that may indicate position and/or path of travel for one or both cars. In addition, the movements of the ego-car and the other car may be determined based on a stationary camera or cameras that have a view on the scene of the traffic event, or may be based on a camera that is affixed to a third car passing through the scene of the traffic event.

A car mounted camera may aid in this determination, but methods of detecting a driving action that mitigates risk that do not rely on cameras are also contemplated. For example, a method of determining position, such as GPS and/or dead-reckoning from a known location, in conjunction with previously or subsequently obtained information about the position of a stop sign, may be used together to determine that the hard-braking event may have occurred in response to the stop sign at the known or estimated stop sign position.

According to certain aspects of the present disclosure, detecting a driving action that mitigates risk may be rule-based, and/or may be based on the output of a neural network trained on labeled data. For example, the output of a neural network may be used to identify other cars in the vicinity. FIGS. 3A-D and FIGS. 4A-D illustrate examples of systems and methods of detecting driving actions that mitigate risk based on rules in combination with outputs of a neural network. Determinations of cause of traffic events based on rules and/or neural networks may also be used to train a second neural network to detect and/or characterize traffic events and/or determine cause of a traffic event.

Figure 3A:
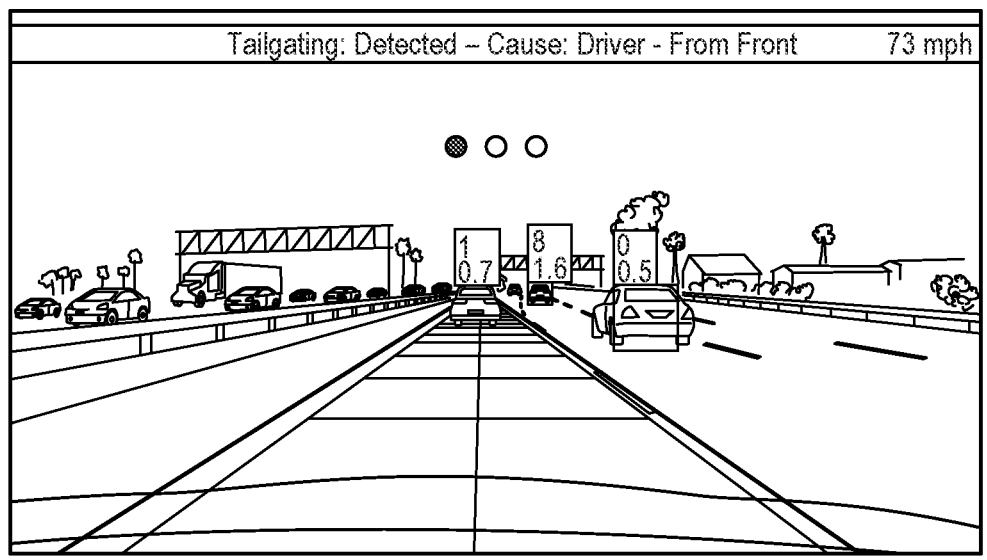
FIG. 3A illustrates an example of a system for detecting a driving action that mitigates risk in accordance with certain aspects of the present disclosure.

FIG. 3A illustrates an example of detecting a driving action that mitigates risk in which tailgating is detected and the cause is assigned to the ego-driver (or "Driver"). In the video frames shown in FIGS. 3A-D and FIGS. 4A-D, the type of event and the determined cause is shown on the top of the video frame, along with additional information. In FIG. 3A, the type of event is "Tailgating", the determined cause is "Cause: Driver" and the additional information is "From Front".

In this example, certain aspects of the present disclosure were used to detect and track other cars, including a car that is in the same lane as the Driver. In FIG. 3A, three cars travelling in the same direction as the Driver are tracked. Each tracked car has an empty colored square, which may be called a "bounding box", drawn over the location of the tracked car, along with a filled square containing information about the car. In this example, a car ID is displayed in the top line of each filled square, and the distance to that car (in which the distance has been converted to time based on the distance and the Driver's travelling speed) is displayed in the next line of each filled square. From left to right, the tracked car IDs are "1", "8", and "0", and the determined following distances in time is "0.7", "1.6" and "0.5" seconds, respectively.

The distance may be determined, for example, based on methods described above and/or in the incorporated applications, or by other means, such as by helicopter, autonomous aerial vehicle, smart pavement, and the like. The determined speed of the driver's car, which may be used to determine a following distance in time, is displayed at the top right of the video frame. In FIG. 3A, the determined speed of the Driver is 73 miles per hour.

In one embodiment of the present disclosure, "tailgating" may be configured to mean that the Driver is travelling at an unsafe distance behind another car in the same lane as the Driver. In another embodiment of the present disclosure, "tailgating" may be configured to mean that the Driver is travelling within a range of safe following distances at which the Driver's may benefit from reduced wind resistance and thereby improve fuel efficiency. FIGS. 3A-D and FIGS. 4A-D illustrate examples from an embodiment of the present disclosure in which "tailgating" is configured to mean that the Driver is traveling at an unsafe distance behind another car in the same lane.

In FIG. 3A, the determined following distance to the car with ID "1" (car ID 1) is 0.7 seconds. A tailgating threshold may have been determined previously based on a user specification, and/or may be based on data that indicates what may be considered a safe following distance for a given driver and/or for a given road condition and/or for a given region. In this example, tailgating is configured to mean travelling at an unsafe distance behind another car and configured with a minimum safe following distance of 1 second. Since car ID 1 is in the same lane and is spaced at a following distance that is substantially below 1 second (0.7 seconds), a traffic event is detected. The bounding box around car ID 1 may be colored red in a color display, and the filled square above the detected car may also be colored red, to identify which car is being tailgated. In addition, a red/yellow/green indicator displayed in the top center portion of the video frame shows a filled red circle, an unfilled yellow circle and an unfilled green circle. In the black and white drawing in FIG. 3A, the three indicator circles are depicted in black and are distinguishable by position, with the red circle filled and on the left, the yellow circle in the middle, and the green circle on the right. In this configuration, the red/yellow/green indicator indicates an unsafe driving situation (red, left), driving that is close to the threshold of unsafe (yellow, middle), and safe driving (green, right), depending on whether the red, yellow, or green circle is filled, respectively. The red/yellow/green indicator in FIG. 3A indicates that an unsafe traffic event (tailgating) has been detected.

As can be seen in FIG. 3A, other cars may be at an even shorter following distance, but may not be considered participants in a tailgating event. For example, car ID 0 is shown as having a following distance of 0.5 seconds. However, car ID 0 is not in the same lane as the driver. Instead, car ID 0 is in the lane to the right of the driver. In this example, since the Driver's car is in the left most lane, and there is a car within the threshold for tailgating in the right lane, the Driver does not have the option to change lanes at the time of the tailgating event.

In FIGS. 3A-D and FIGS. 4A-D, detected lane markings are drawn as heavy black lines at locations corresponding to the left and right lane boundaries of the current lane of the Driver. In addition, the determined future path of travel, as determined according to certain aspects of the APP methods described above, is depicted as a grid that tapers to a narrower width from the bottom to the middle of the video frame.

Figure 3B:
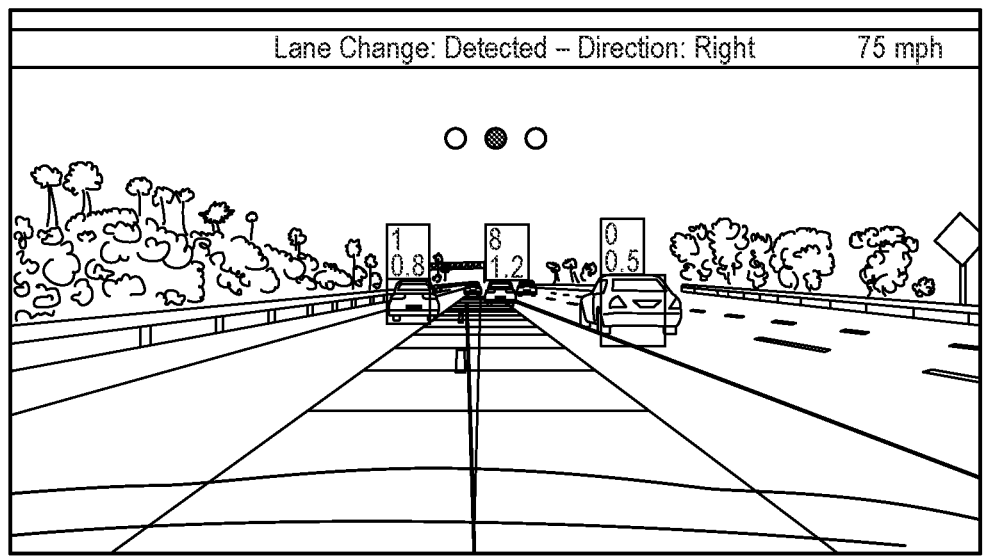
FIG. 3B illustrates an example of a system for detecting a driving action that mitigates risk in accordance with certain aspects of the present disclosure.

A short time after the event shown in FIG. 3A, the driver changes lanes. FIG. 3B shows the video frame captured from the camera attached to the Driver's car as the Driver is changing from the left lane to the lane formerly occupied by cars with IDs 0 and 8. As can be seen, car ID 0 has also moved over one lane since the video frame shown in FIG. 3A.

The detection of a lane change may be based on the locations of the detected lane boundaries, as shown in heavy black lines. In FIG. 3B, the left lane boundary intersects the bottom of the video frame near the center of the frame. The right lane marking would intersect the bottom of the video frame off to the right of the frame. Given the known or inferred orientation of the camera with respect to the body of the car (which may be inferred from the portions of the hood of the Driver's car in the bottom of the frame or which may be calibrated based on acquired video frames) these lane boundary positions may be used to determine that the car is crossing a lane boundary into another lane.

In addition, or alternatively, the relationship between the detected lane boundaries and the vanishing point (VP) to which the detected lane boundaries point may be used to determine that the car is changing lanes. For example, the right lane boundary in FIG. 3A becomes the left lane boundary in FIG. 3B. In FIG. 3A, the detected right lane boundary intersects the bottom of the video frame at a horizontal position that is substantially to the right of the vanishing point. In FIG. 3B, however, the same lane boundary (which is now the left lane boundary instead of the right lane boundary as it was in FIG. 3A) intersects the bottom of the video frame at a position that is substantially similar to the horizontal position of the vanishing point. This change of the relative positions of lane boundaries and the vanishing point of the detected lanes may be used to determine that a lane change has occurred. The detected lane change is indicated in the text box near the top of the video frame as "Lane Change: Detected—Direction: Right".

In this example, after the lane change, the following distances of the three tracked cars are 0.8, 1.2, and 0.5 seconds for the cars that are in the lane to the left of the Driver, in the same lane as the Driver, and in the lane to the right of the Driver, respectively. Because the car that is in the same lane as the Driver (car ID 8) is more than 1 second away from the Driver, there is no detected tailgating event in this frame. Still, the following distance to car ID 8 is 1.2 seconds, which may be considered close to the threshold. The red/yellow/green indicator in the center near the top of the frame therefore indicates a "yellow" state, meaning that the following distance is close to the threshold for a traffic event. In this example, the Driver is exhibiting driving behavior that is close to the configured threshold for tailgating.

A system or method in accordance with certain aspects of the present disclosure may determine that, while the traffic event (a tailgating event) was caused by the monitored driver, the monitored driver performed an action (a lane change) that reduced the risk in the surrounding environment. Still, an embodiment of the present disclosure may be configured such that a risk mitigating action of this type is not recognized as a "Star Alert." For example, the system may be configured so that "Start Alerts" are suppressed when the corresponding traffic event to which the driver's action was responsive was also caused by the monitored driver.

Figure 3C:
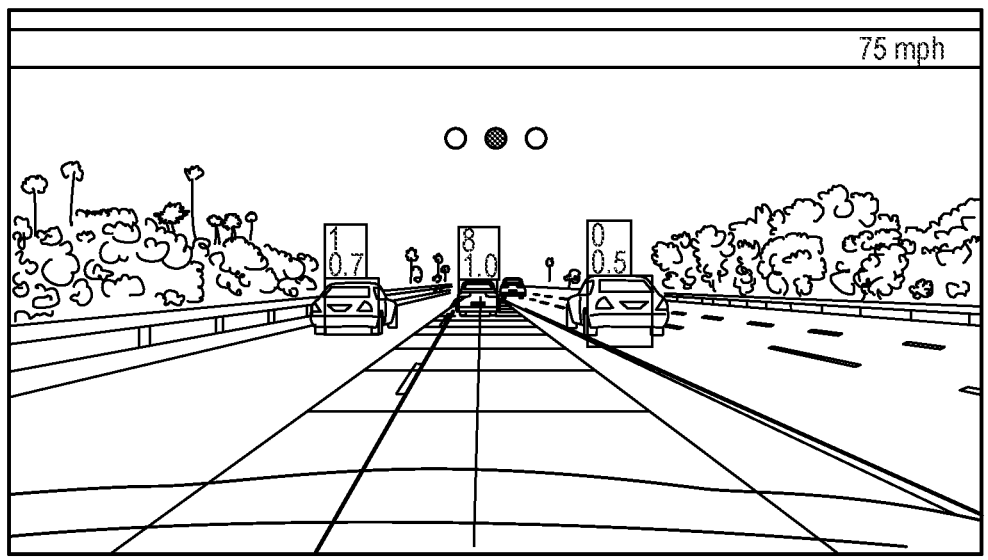
FIG. 3C illustrates an example of a system for detecting a driving action that mitigates risk in accordance with certain aspects of the present disclosure.
Figure 3D:
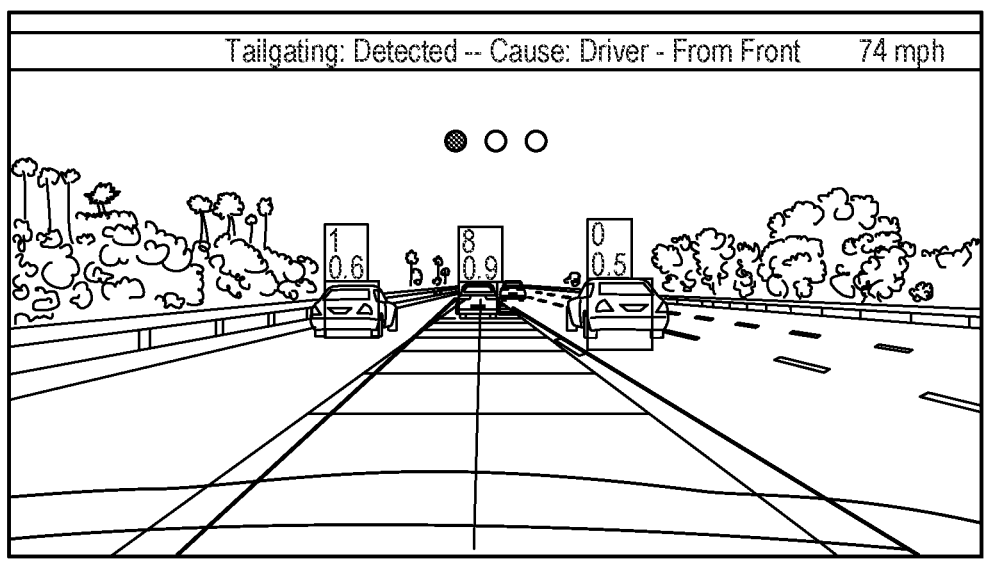
FIG. 3D illustrates an example of a system for detecting a driving action that mitigates risk in accordance with certain aspects of the present disclosure.

As shown in the video frame in FIG. 3C, which was captured a short time after the video frame shown in FIG. 3B, the Driver has been driving faster than car ID 8, and the following distance has decreased to 1.0 seconds. A short time later, as shown in the video frame in FIG. 3D, the following distance has now decreased to 0.9 seconds, and once again a tailgating event is identified. The cause of the traffic event (tailgating) shown in FIG. 3D is assigned to the Driver according to a configurable set of rules that are described in the next section.

In the example driving scenario illustrated in FIG. 3, the driver performed one action (a lane change) that had an effect of mitigating risk in the environment. This action, however, was sandwiched between two risky traffic events that could also be attributed to the driver. A system or method for determining actions that mitigate risk may determine that the driver is alert and responding to the environment but may further determine that the behavior of the driver is aggressive. To determine whether the driver's behavior should be recognized with positive reinforcement, such as with a "Star Alert", a comparison of driving risk after a driver's action may be compared with the predicted risk of a typical driver. A typical driver, for example, may not be an aggressive driver. In this example, at the time corresponding to the scene illustrated in FIG. 3 3C, a system may determine that a typical driver would not only have changed lanes, but would have also created more space between himself and other cars on the road. In some embodiments, a driving action that is at least as safe as a typical driver in the same scenario may be a criterion for the awarding of a DriverStar.

Figure 4A:
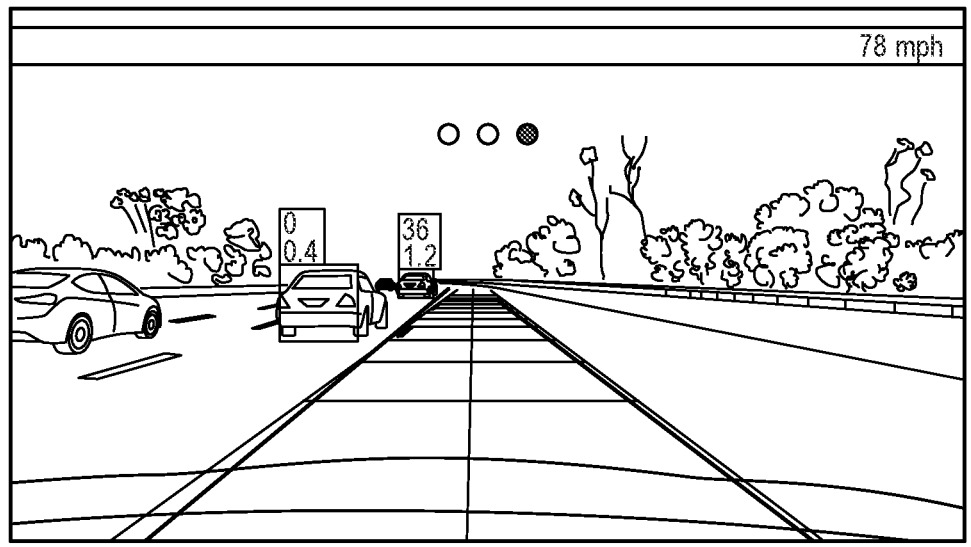
FIG. 4A illustrates an example of a system for detecting a driving action that mitigates risk in accordance with certain aspects of the present disclosure.

FIGS. 4A-D illustrate an example of a tailgating event that is not the cause of the Driver. FIG. 4A, which depicts a video frame captured about 30 seconds after the video frames that are depicted in FIGS. 3A-D, shows that the driver is in the far-right lane with no visible cars in the same lane. Car ID 0 and car ID 36 are detected and tracked in the lane to the left of the Driver. The distance to car ID 0 is 0.4 seconds and the distance to car ID 36 is 1.2 seconds. We can infer from these following distances that car ID 0 is tailgating car ID 36, since the difference is following times is (1.2 seconds-0.4 seconds=0.8 seconds) is substantially less than the configured threshold for tailgating (1.0 seconds). Still, the Driver in this example, which is the driver of the car to which the camera collecting the video frame is attached, is not exhibiting tailgating behavior. The red/yellow/green indicator, therefore, is in a green state (right-most black circle is filled), indicating that the Driver is exhibiting good driving behavior at this time.

According to certain aspects of the present disclosure, the Driver may be alerted that a car in an adjacent lane (for example, car ID 0 in FIG. 4A) is exhibiting unsafe driving behavior (tailgating), and/or may receive a positive reinforcement or positive driving assessment for avoiding the unsafe driver. The Driver may avoid and unsafe driver, for example, by slowing down and thereby increasing the following distance to that car, even though the that car is in an adjacent lane. Furthermore, an embodiment of the present disclosure may report the unsafe driving of another driver by sending a message to a centralized database. In addition, or alternatively, in the case that the observed car is a part of a recognized fleet of automobiles (such as a trucking line or a ride sharing network such as Uber or Lyft), an embodiment of the present disclosure may report the unsafe driving event to a safety manager responsible for the fleet of automobiles or to other interested parties.

Figure 4B:
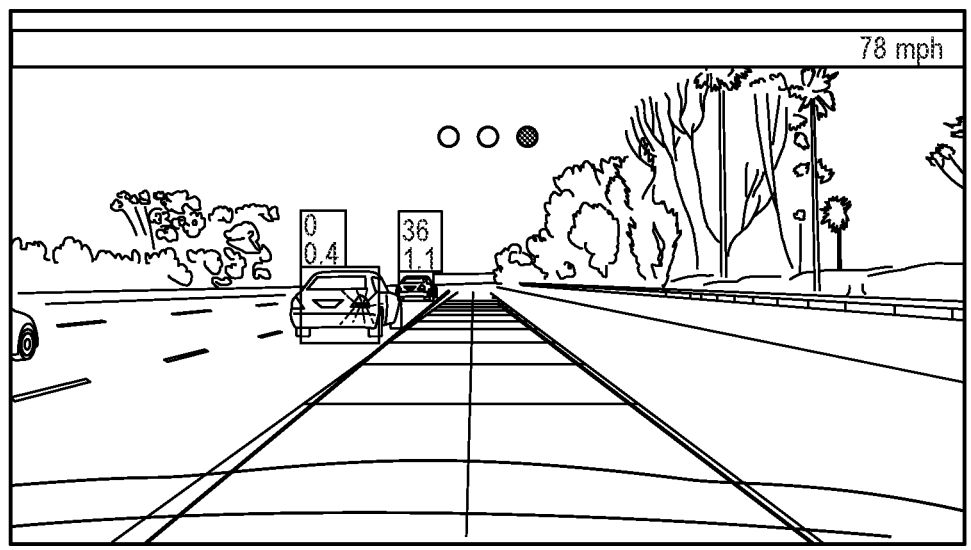
FIG. 4B illustrates an example of a system for detecting a driving action that mitigates risk in accordance with certain aspects of the present disclosure.

FIG. 4B, which includes a video frame that was captured shortly after the video frame shown in FIG. 4A, shows that car ID 0 has signaled an intention to change lanes into the monitored driver's lane.

Figure 4C:
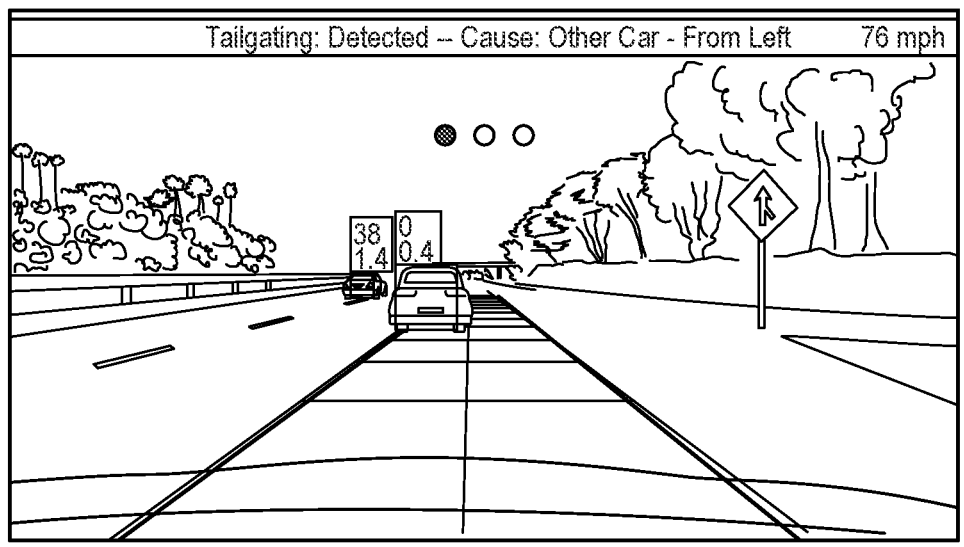
FIG. 4C illustrates an example of a system for detecting a driving action that mitigates risk in accordance with certain aspects of the present disclosure.

FIG. 4C, which includes a video frame that was captured shortly after the video frame shown in FIG. 4B, shows that car ID 0 has entered the Driver's lane from the left. The text banner near the top of the image indicates: "Tailgating: Detected—Cause: Other Car—From Left". The red/yellow/green indicator is in the red state, indicating the unsafe driving event. Unlike the example in FIGS. 3A and 3D, however, this unsafe driving situation was caused by the other car and not the Driver. In some embodiments of the present disclosure, events for which the cause is not attributed to the Driver may not impact an overall rating of the Driver's driving behavior. Additionally, video data associated with such events may not be transmitted wirelessly to a safety manager or other interested party in consideration of bandwidth or storage costs. An alternative embodiment of the present disclosure, however, may be configured so that a certain number of events caused by other drivers may negatively impact a Driver's overall driving behavior assessment, as a number of such events may indicate that the Driver tends to put himself or herself in the vicinity of unsafe driving events.

Figure 4D:
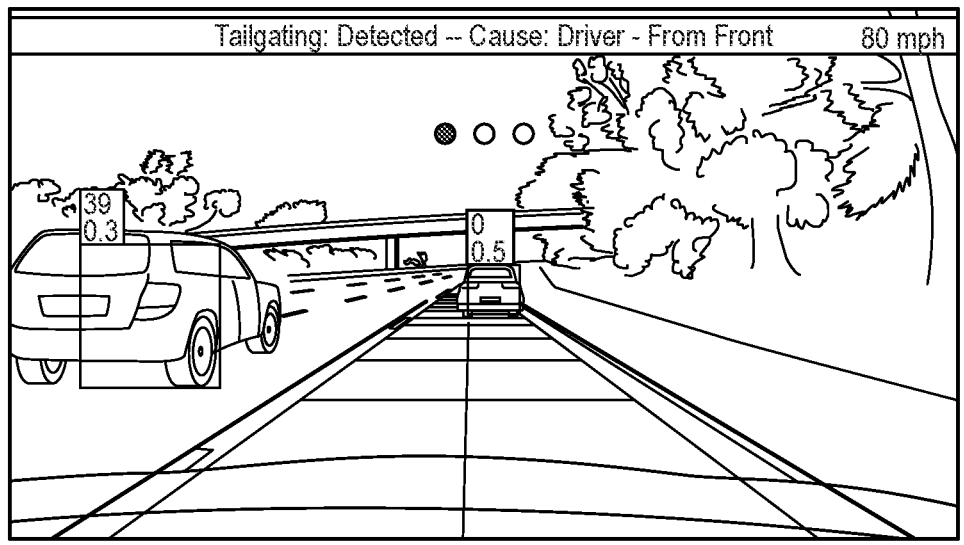
FIG. 4D illustrates an example of a system for detecting a driving action that mitigates risk in accordance with certain aspects of the present disclosure.

FIG. 4D, which includes a video frame that was captured several seconds after the video frame shown in FIG. 4C, shows that the Driver is still tailgating car ID 1, now at a following distance of 0.5 seconds. While the following distance has increased from 0.4 seconds to 0.5 seconds, the speed of the Driver has also increased from 76 mph to 80 mph. In accordance with a configuration of tailgating rules that are described in the next section, a new tailgating event is now detected and the cause is attributed to the Driver. In this configuration, if a tailgating event that is caused by another driver continues for more than 5 seconds, a new tailgating event is triggered that is now attributed to the Driver. In this example, when the Driver gets cut off, the cause may be initially attributed to the other driver. The Driver then has some time (for example, 5 seconds for the time that the other driver first entered the Driver's lane) to respond and create an appropriate following distance. If the Driver does not, then the cause for the persistent tailgating may be assigned to the Driver.

In some embodiments of the present disclosure, the relative speeds of the Driver's vehicle and another vehicle may be compared. In addition, the pedal actions (which may be determined from a bus (such as OBD2/CANBUS/J1939)), or may be inferred based on visual information, may be used to modify rules for determining cause. In one embodiment, the thresholds for determining the presence and/or severity of tailgating may be modified based on the relative speed of the cars. For example, if a Driver gets cut off but the relative speeds of the cars are such that the separation is increasing, then the Driver may be given more time to slow down or change lanes before a persistent tailgating event is assigned to the Driver. Similarly, if the pedal action or fuel flow of the Driver's car indicate that the driver has taken positive action to increase the following distance, then additional time may be allowed.

While FIGS. 3A-D and FIGS. 4A-D illustrate a method of determining an action that mitigates risk that is responsive to tailgating events, the actions that are responsive to other traffic events are also contemplated. Furthermore, while FIGS. 3A-D and FIGS. 4A-D illustrate the functioning of an embodiment of the present disclosure that relies on a camera sensor, other sensors are contemplated. Embodiments that do not include camera sensors are also contemplated. For example, the detection of a traffic event may be based on inertial sensors, which may, for example, indicate a hard stop. In this case, the cause of the hard stop may be determined with the aid of a camera if, for example, the hard stop was caused by the sudden presence of a pedestrian or a bicyclist. A camera may not be necessary, however, if the hard stop is caused by a red light, and the driver's car records the presence of the red light based on a data message broadcast from the traffic light.

While FIGS. 3A-D and FIGS. 4A-D illustrate an example in which a lane change was determined based on visual cues, some embodiments of the present disclosure may infer lane changes based on inertial sensors and/or based on readings of a signaled lane change from the Driver's car and a corresponding movement of the steering wheel.

Detecting Driving Actions that Mitigate Risk—Hard-Braking, Pedestrian

FIGS. 5A-D illustrate an example of a hard-braking event that is caused by a road condition. In this example, the hard-braking event is caused by a pedestrian crossing the street at an unexpected location. FIGS. 5A-D illustrate annotated images captured by a camera located inside of a truck and facing forward.

Figure 5A:
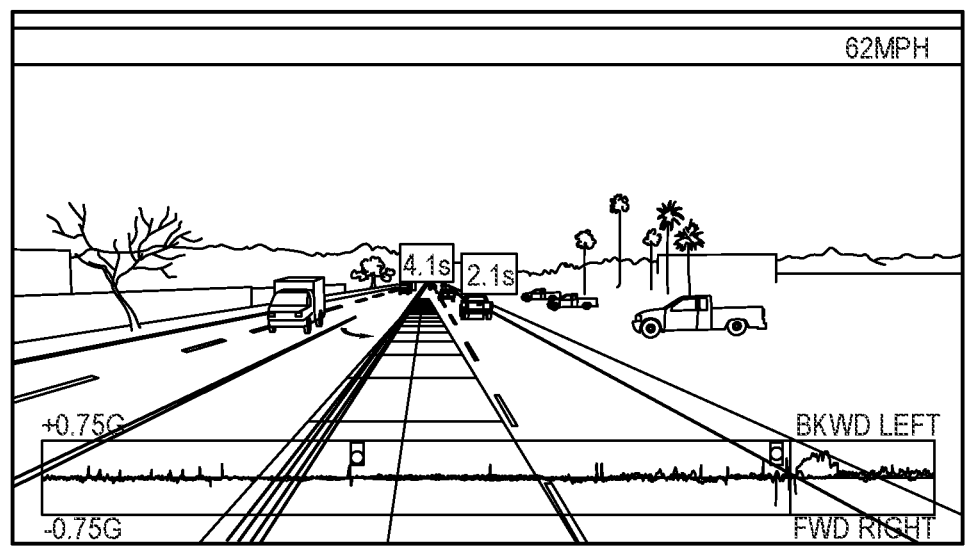
FIG. 5A illustrates an example of a system for detecting a driving action that mitigates risk in accordance with certain aspects of the present disclosure.
Figure 5B:
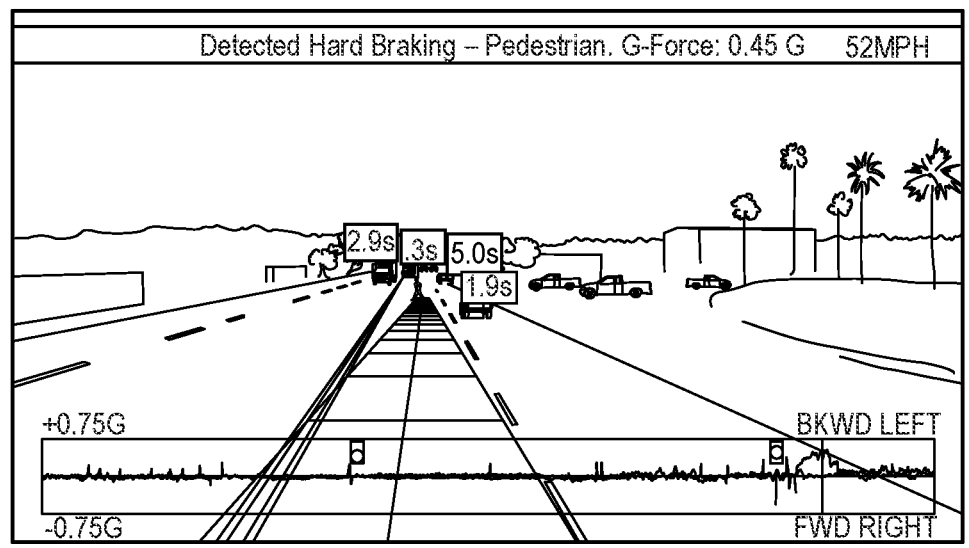
FIG. 5B illustrates an example of a system for detecting a driving action that mitigates risk in accordance with certain aspects of the present disclosure.

FIG. 5A illustrates an apparently normal driving scene with two lanes of traffic travelling in the direction of the monitored Driver, a central turn lane, and two lanes in the on-coming direction. On this wide road, the traffic is moving at a fast speed, with the monitored Driver travelling at 62 MPH. In FIG. 5B, a pedestrian can be discerned crossing the street. At this point the pedestrian is directly in front of the Driver. According to a distance estimate of a nearby vehicle, the Driver will arrive at the location of the pedestrian in 2.0 seconds. The Driver has already reduced his speed to 52 MPH and is still braking.

Figure 5C:
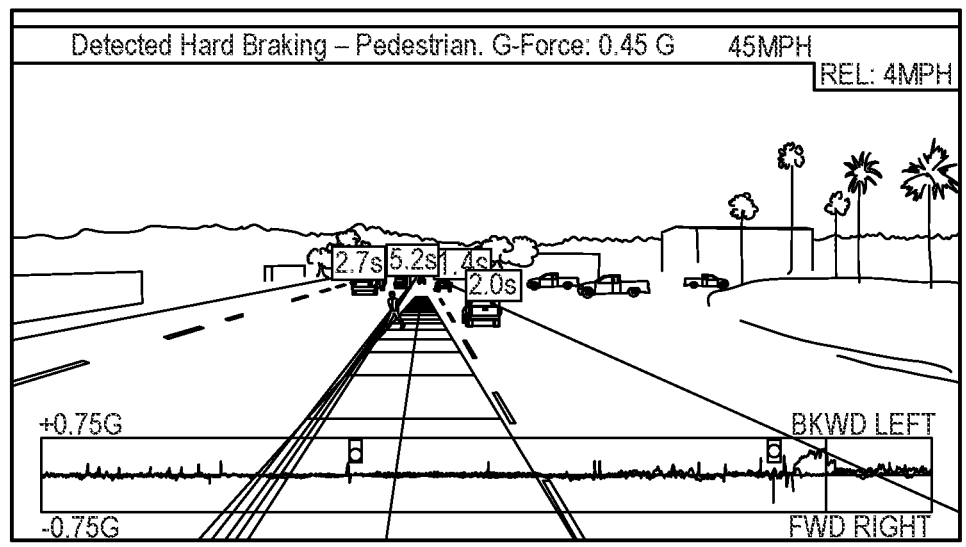
FIG. 5C illustrates an example of a system for detecting a driving action that mitigates risk in accordance with certain aspects of the present disclosure.
Figure 5D:
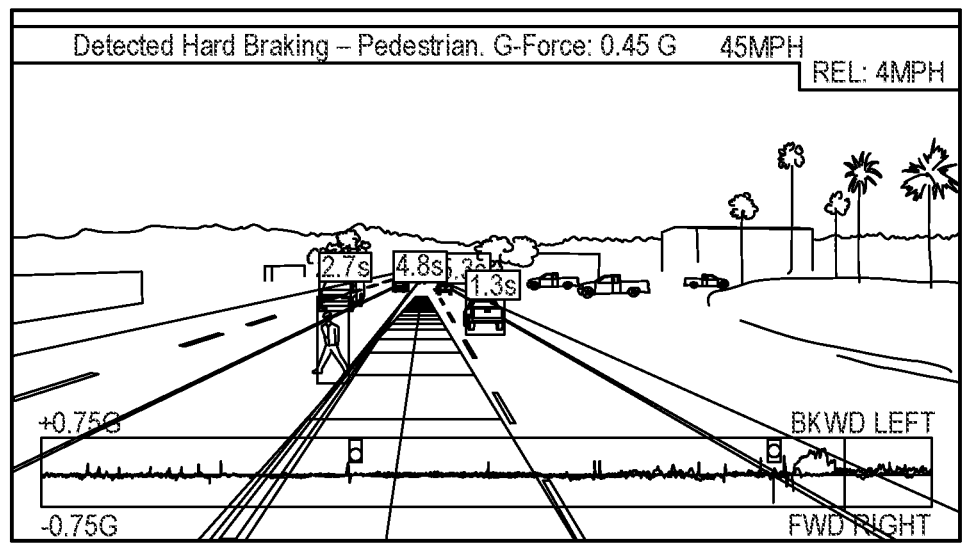
FIG. 5D illustrates an example of a system for detecting a driving action that mitigates risk in accordance with certain aspects of the present disclosure.

At the time that the image of FIG. 5C is captured, the monitored Driver's speed has further reduced to 45 MPH. The Pedestrian has almost cleared the monitored Driver's lane. The peak hard-braking forced was measured as 0.45 G. Shortly thereafter, as illustrated in FIG. 5D, the Pedestrian has cleared the Driver's lane and has entered the middle turn lane.

In the example shown in FIGS. 5A-D, a traffic event may be attributable to an unexpected road condition, such as the sudden appearance of a Pedestrian at a location far removed from a crosswalk. In this example, the cause of the hard-braking event may not be assigned to the Driver, since the Driver responded appropriately to the unexpected and atypical traffic event. According to certain aspects of the present disclosure, the determined cause of the event may impact a summary score of the Driver differently depending on the determined cause. For example, the impact on the Driver's score may be more positive than it would be if the determined Cause were the monitored Driver. In some embodiments, the impact on the monitored Driver's score as a result of the determined event may be positive overall. In the case of avoiding a collision with a Pedestrian, a successfully executed hard-braking maneuver may indicate alert and proactive driving. In this view, the hard-braking maneuver may be an event that a fleet manager or the like would want to acknowledge and encourage.

Some driver monitoring systems may focus on identification of problematic and/or risky driving. For example, a driver monitoring system based on inertial sensor reading may identify driving maneuvers that are subsequently labeled reviewed by a human operator and then reported if the operator determines that all of the criteria of the problematic and/or risky driving behavior were met. In one example, an inertial sensor reading may indicate a hard-braking event. Video associated with the hard-braking event may then be transmitted to a human operator. The human operator may then reject alerts corresponding to sequences like the one just described. That is, for a system configured to find examples of negative driving, an example of positive driving may be mistakenly detected based on an inertial signature. Such an alert is then typically suppressed by a human operator who may review the corresponding video footage to reject "false alarms". Accordingly, with currently available driver monitoring systems, any 'above-and-beyond' driving maneuvers may only be reported through visible bystander eyewitness account. Such accounts may occur at a very low frequency.

Systems and methods in accordance with the present disclosure however, may positively recognize a traffic sequence such as the one illustrated in FIGS. 5A-D as an example of good driving.

According to certain aspects of the present disclosure, a driver monitoring system may enable improved visibility into the day of a driver. For example, an embodiment of the present disclosure may capture and analyze driving event when risky driving or risky traffic environments are not identified. The system may positively determine that the driver is driving in a low risk environment, as may accordingly assign a rating of "safe" to these periods of driving.

There may be many instances in which a driver, who may be a professional driver, may have deep domain experience and may actually cause the driving environment around them to be less risky for themselves and for other drivers. That is, a driver may perform driving maneuvers that are not only safe (have little or no risk), but, furthermore, through the execution of the action the driver may have created a safer driving environment for all vehicles within the immediate cluster.

In the example illustrated in FIGS. 5A-D, the monitored driver's alert braking may have caused other drivers to take notice of the pedestrian who was jaywalking across the road. According, a "Star Alert" may be generated responsive to the detected driving action or sequence of actions that serves to improve the immediate driving environment.

Figure 6A:
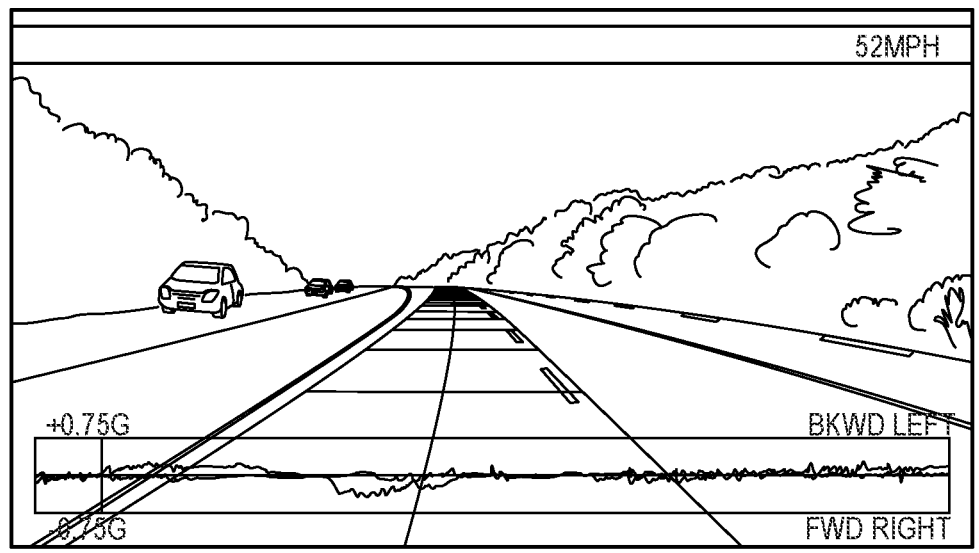
FIG. 6A illustrates an example of a system for detecting a driving action that mitigates risk in accordance with certain aspects of the present disclosure.

Detecting Driving Actions that Mitigate Risk—Hard-Acceleration, Emergency Vehicle FIGS. 6A-D illustrate an example of an atypical hard-acceleration event that is caused by an emergency vehicle. FIGS. 6A-D illustrate annotated images captured by a camera located inside of a car and facing forward. FIG. 6A illustrates a normal driving scene. The monitored Driver is in the left lane of a two-lane road that is separated from on-coming traffic by a cement divider. The road leads to a highway and has a wide shoulder. The Driver is travelling 52 MPH.

Figure 6B:
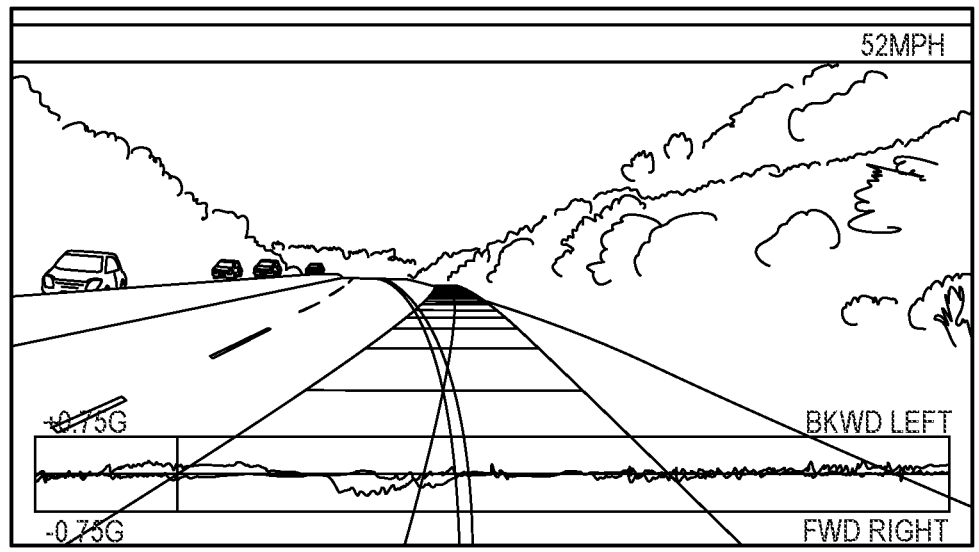
FIG. 6B illustrates an example of a system for detecting a driving action that mitigates risk in accordance with certain aspects of the present disclosure.
Figure 6C:
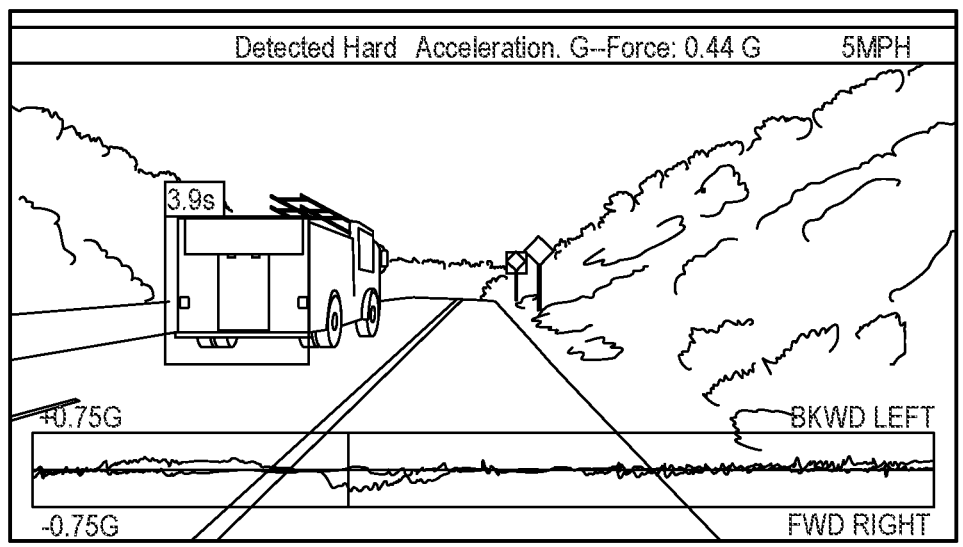
FIG. 6C illustrates an example of a system for detecting a driving action that mitigates risk in accordance with certain aspects of the present disclosure.
Figure 6D:
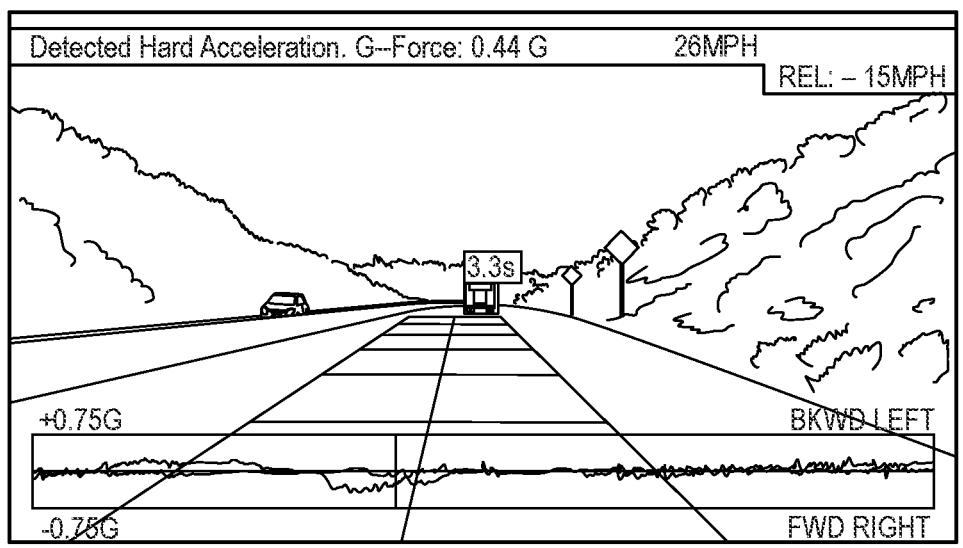
FIG. 6D illustrates an example of a system for detecting a driving action that mitigates risk in accordance with certain aspects of the present disclosure.

The image in FIG. 6B indicates that the Driver has changed lanes twice to get over to the shoulder. In addition, he has been braking steadily for several seconds and is now travelling 34 MPH. The Driver did not brake hard enough to trigger the detection of a hard-braking traffic event and therefore may have been missed by an inertial-trigger based driver monitoring system. In FIG. 6C the Driver is starting to accelerate again from rest, traveling 5 MPH on the shoulder. The cause of the Driver's maneuver is now visible as a fire truck races by. In FIG. 6D, now that the fire truck has safely passed, the monitored Driver has returned to the road. At this point, the monitored Driver has to quickly regain Highway speed. In doing so, he accelerates with a detected maximum force of 0.44 G. According to previously determined thresholds, this triggers a hard-acceleration traffic event.

There are several methods contemplated to determine whether this hard-acceleration event is responsive to determined traffic event. For methods that rely on visual data, a system in accordance with the present disclosure may detect the fire-truck and determine that it is an emergency vehicle. In one example, the detection of a fire-truck at a time shortly after the hard-braking event may indicate that the cause of any detected traffic event could be attributable to the fire-truck. In another example, the presence of the emergency police vehicle may be determined based on an audio signal recorded by a microphone on a driver monitoring device. In another example, the presence of the emergency vehicle may be communicated via a dedicated short-range communications (DSRC) protocol. In another example, the pattern of driving behaviors exhibited by other visible or otherwise detectable drivers may be used as the basis for determining that the monitored Driver was responding to the presence of an emergency vehicle. In this example, the trajectories of other detected and tracked cars may be consistent with traffic making room for an emergency vehicle to pass. Because the hard-braking event appeared a short time before the hard-acceleration event, the driver may be excused for the hard-acceleration.

Furthermore, in accordance with certain aspects of the present disclosure, the monitored driver may be recognized as having performed a positive "Star Alert" when he pulled over in response to the fire-truck. In this example, the traffic event to which the driver's action was responsive may have occurred prior to the time that the unsafe traffic event (e.g. a hard braking event) could have been detected. For example, the presence of the emergency may not have been detected by the system until the emergency vehicle passed by the vehicle. In this example, the system may first detect the action of the driver and then determine that it was responsive to an traffic event that was detected at a later time.

Learning to Detect Actions that Mitigate Risk

According to certain aspects of the present disclosure, detecting a driving action that mitigates risk may be based on a learning-based causation model. According to certain aspects, a multi-layer perceptron may be trained on supervised training data to generate risk level labels. Alternatively, a video caption generation system may be trained on a series of frames. The video capture generation system may be based on a Recurrent Neural Network (RNN) structure, which may use Long Short-Term Memory (LSTM) modules to capture temporal aspects of a traffic event.

The data used to train a learned model may be generated by a rule-based approach, such as described above. These labels may be accepted, rejected, or corrected by a human labeler. According to certain aspects, inputs from fleet safety officers may be utilized. For example, a fleet safety officer may correct a given action responsivity label, or may agree with labels that are provided by a rule-based and/or neural network based system. These labels may then be used to bootstrap from the rule based approach to a machine learned model that exhibits improved performance.

Driver Safety Monitoring in Fleets

In the United States, the Occupational Health and Safety Administration (OSHA) may require that employers provide their employees with a safe working environment and comply with federal safety regulations. While OSHA may enforce these regulations through worksite inspections and recording requirements, it often falls to employers to create an organizational climate that prioritizes safety, even in the face of competing organizational goals. A positive safety climate may exist when employees believe that safety is valued and expected by their organization. A positive safety climate may lead to increased safety performance and, as a result, reduced workplace accident and injury rates. Conversely, a poor safety climate may be linked to increases in workplace accident and injury rates as well as accident underreporting. Research emphasizes that managerial commitment is key to the promotion, maintenance, and reinforcement of a positive safety climate. All levels of management, from senior executives to frontline supervisors, may publicly commit to, communicate, and treat safety as a priority. They may effectively do so through a safety program that is designed to recognize and reward appropriate safety behaviors.

Fleets may recognize and reward drivers based on time/mileage based milestones. For example, a Safety Award Program may recognize driver associates who operate without a preventable accident. Awards, which may include pins, hats, patches, and jackets, may be given after 6 months, 1 year, and then every year thereafter.

Existing driver monitoring solutions may focus on reducing the frequency of negative driver behavior events. With these systems, a fleet manager may identify risky driving behavior and may seek to correct driving skills through coaching. Current driver monitoring system however, may not consider positive factors relating to driving compliance, positive performance, good driving, and a driver's execution of an action or set of actions responsive to a detected traffic event that has the effect of mitigating risk.

Encouraging Good Driving Behavior

According to certain aspects of the present disclosure, a driver monitoring system may consider positive factors. These factors may contribute to a system of encouraging good driving behavior. An embodiment of certain aspects of the present disclosure may be referred to as DRIVERI™. A DRIVERI™ system may serve as a driver advocate, by providing fleets with systems and methods to recognize and reward their drivers for exhibiting good driving behavior.

Current driver monitoring systems may equate an absence of negative driving event detections with good driving. However, time spent outside of dangerous events may be made up of many moments of at-risk driving that are not dangerous to varying degrees. For example, there may be a range of driving between safe driving and proactively courteous driving.

A system that analyzes driving behavior based on the absence of negative traffic events may not accurately consider time that does not include driving at all. According to some systems, a driver who experiences one negative driving event in twenty minutes of driving may be considered as safe as a driver who experiences one negative driving event over the course of an eight-hour driving shift. Furthermore, systems that are based on the detection of negative driving event may emphasize the most dangerous driving behaviors exhibited by a driver, and may fail to properly recognize and reward safe and courteous driving.

Certain aspects of the present disclosure may be applied to create awareness of the portion of a driver's day that may be under-recognized by existing driver monitoring technologies. A system in accordance with the present disclosure may affirmatively analyze time intervals to quantify different aspects of safe driving. A time interval of safe driving may be defined not just as an absence of a negative event (such as a hard-braking event), but instead may be defined based on a number of pre-configured criteria. Examples of such criteria include maintaining proper lane position, using lane change indicators, making room for vehicles stopped on the shoulder, and the like. If a driver is exhibiting all of the desired features, he may be considered to be driving in the GreenZone™.

Unlike a system based on detecting negative events alone, a GreenZone™ system may serve as a basis for positive reinforcement. For any system of driver monitoring, it may be desirable to increase good, safe, and courteous driving, and also decrease negative driving events, such as collisions, hard-braking, and the like. A system based on punishment for detected negative behaviors may attempt to stop negative driving behaviors. Such a system, however, may not encourage specific good driving behaviors. In addition, such a system may fail to recognize at-risk driving situations which do not result in a negative driving event. While being in a situation in which an accident is likely may not be as undesirable as being in an actual accident, for a driver who frequently finds himself in situations for which an accident is likely, it may only be matter of time.

By focusing on positive behaviors, instead of or in addition to negative behaviors, the dynamic between a fleet manager and a driver may change. Rather than focusing exclusively on collisions and near-collisions, with GreenZone™ monitoring, a fleet manager may be able to point out expert maneuvers by expert drivers in the fleet. Such recognition may strengthen the relationship between excellent drivers and a trucking company. In addition, examples of excellent driving may be used to instruct less experienced drivers.

In some of the traffic scenarios described herein, if the monitored driver fails to adjust to driving conditions, the DRIVERI™ system might report the risky driving condition as a negative event. According to certain aspects of the present disclosure, however, additional context of the driving environment and/or determination that the driver performed an action that mitigated the risk may cause the same event to be classified as a 'StarAlert'.

In addition, a DRIVERI™ system, or other system in accordance with the certain aspects of the present disclosure may track at-risk but not dangerous driving. These instances may be valuable as coachable moments.

A calculation of a GreenZone™ score may be based on the number of minutes driven in a day in which a dangerous event was detected, in which an at-risk event was detected, and during which the driving behavior met the full set of positive driving criteria. In some embodiments, a GreenZone™ score may be further based on exhibited exemplary behaviors, which may be "above-and-beyond" the expectations of a typical safe driver.

In one embodiment, a DRIVERI™ system may continuously record video and other sensor data while a vehicle is running. In one example, the video and other data may be segmented into 1 minute durations. Based on a 1 min video duration and 100% duty cycle, an eight-hour driving day may generate 480 1-minute videos. A driver may not be active for eight hours continuously. In these cases, the number of recorded videos may be less. The recorded videos may be analyzed with a DRIVERI™ service. A recorded video may be analyzed using processors embedded within a device in the vehicle and/or by one or more processors in the cloud. In some embodiments, the processing capabilities of embedded processors may not be able to analyze all the recorded video as fast as it is collected. In this case, some of the recorded minutes may be ignored. In another embodiment, a processor embedded with the vehicle may process the visual data in a streaming fashion.

Several systems and methods of determining causation of traffic events and encouraging good driving behavior are described in PCT application PCT/US17/44755, entitled "DETERMINING CAUSATION OF TRAFFIC EVENTS AND ENCOURAGING GOOD DRIVING BEHAVIOR", filed 31 Jul. 2017, which is incorporated herein by reference in its entirety.

Traffic Incident Reports

For some traffic events, such as traffic events belonging to a particular class, or traffic events corresponding to a particular vehicle and/or time and/or location of interest, it may be desirable to see a traffic report. In accordance with certain aspects of the present disclosure, a traffic incident report may be automatically generated. Traffic incident reports may be generated for positive, proactive driving behaviors as a way of acknowledging and reinforcing positive driving behaviors. Other traffic incident reports may be generated for minor collisions and the like, which may assist a fleet manager's response to the event.

Figure 7:
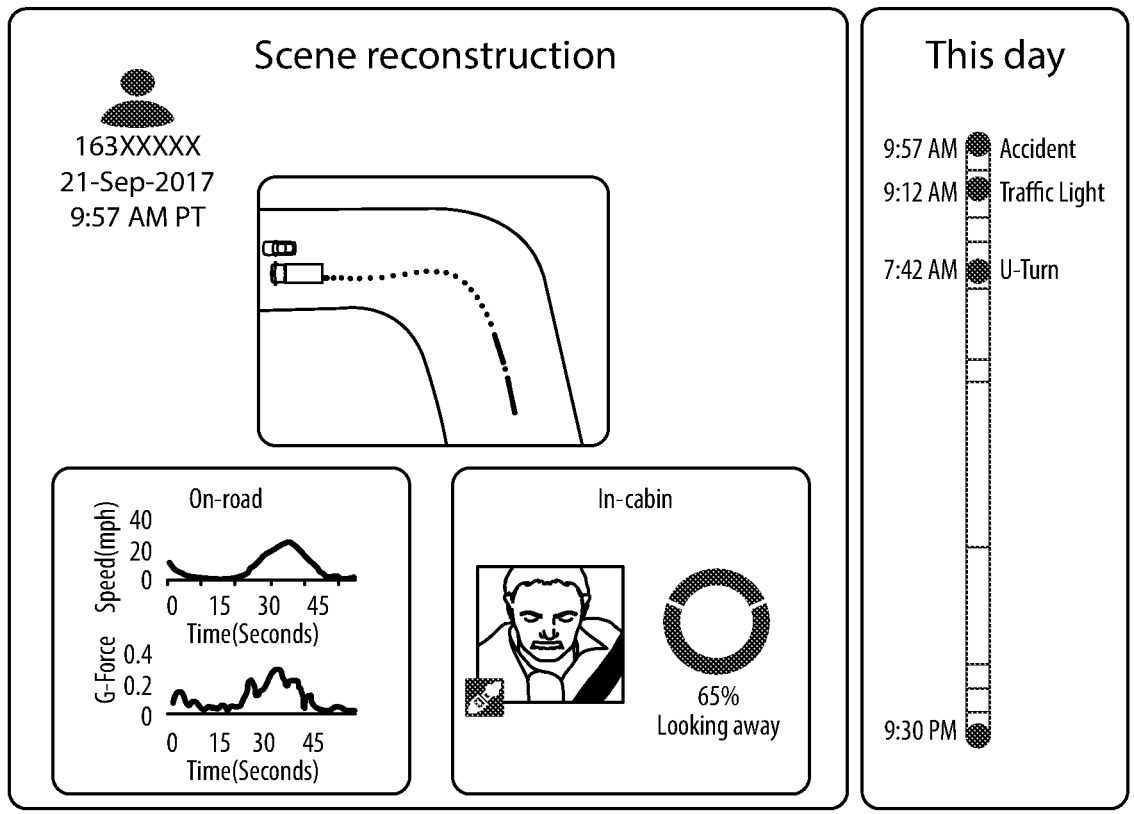
FIG. 7 illustrates an example of a system for automatically generating a report of a traffic event in accordance with certain aspects of the present disclosure.
Figure 7:
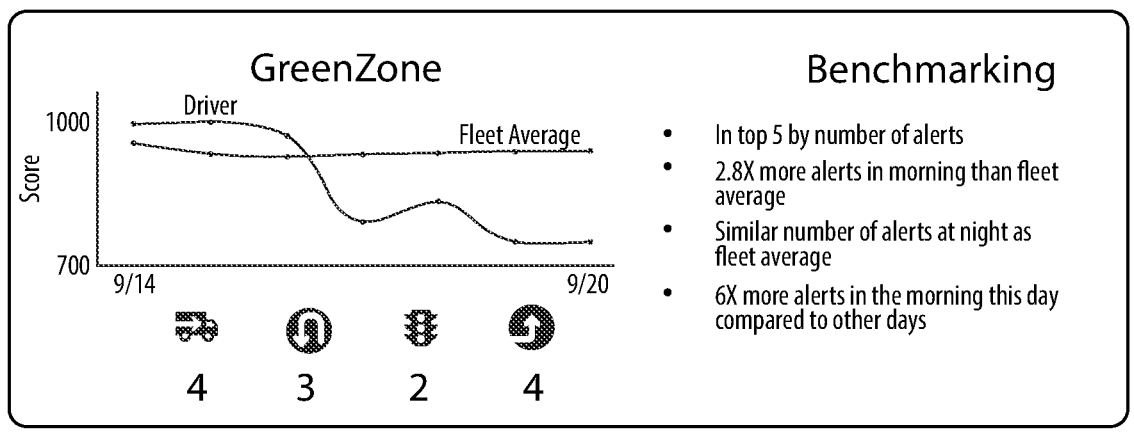

FIG. 7 illustrates a traffic event report that was generated in response to a reported accident. In the incident that is the subject of the report, a truck came into contact with a car that was idling ahead of it at a traffic-light. A traffic incident report of such an incident may be generated based on a user's request, corresponding to a user-provided alert-id, which may be referred to as an incident-id. In another example, a report may be generated based on an automatically detected traffic incident without additional input from a person.

The report illustrated in FIG. 7 includes information relating to the monitored driver at a number of time-scales. A cartoon having a birds-eye view may illustrate the positions of one or more vehicles in a scene for a duration corresponding to a 1-minute period around the accident that is the subject of the report. In some embodiments, a static representation of the report may include a last frame of the cartoon. A corresponding animated video may be available as well. For example, clicking on the cartoon image may enable the user to view a cartoon video of the event.

The report illustrated in FIG. 7 also includes a timeline of green-minutes and alerts by this driver on a day. This information panel may correspond to a day-long time-scale. The report illustrated in FIG. 7 also includes a trend of the daily driver score for this week and summary of alerts. This information panel may correspond to a week-long time-scale. The report illustrated in FIG. 7 also includes a summary of this driver's behavior benchmarked against himself from the previous week, and against the fleet average. The benchmarks may include comparisons based on fine-grained assessments of driving conditions, such as a comparison versus fleet-wide statistics at certain times of day (at night, in the morning heavy-traffic, and the lie). In some embodiments, the text of an accident report may be made editable.

For the particular incident that is the subject of the report illustrated in FIG. 7, the various time-scale information panels may offer additional insight into the context of the accident. The information panels may incorporate information gleaned from outward facing cameras, inward facing cameras, inertial sensors, sensor data available via the OBD port and the like. In this example, the report reveals that the driver ran a red traffic light 45 mins prior to the incident. In addition, the driver consistently had risky/moderate events that led up to the reported incident. Based on the inward-facing camera, it can also be appreciated that the Driver was looking away from the road for a substantial portion of the minute that contained the accident. The driver-score trend is also consistent with these observations.

Based on the provided accident report, one may make inferences that may place a Driver in a better position for success. For example, one may conclude that this driver is not a good "morning-person", but that he is an above average driver at night. In addition, or alternatively, the information selected for the report may be used to determine that the driver was having an unusually bad day. In this case, the traffic incident may have been avoided if there was an intervention (maybe 30 minutes prior), around the time that the Driver's rolling summary driving score can be observed to have decreased.

An accident report generated in accordance with certain aspects of the present disclosure may be useful for enabling timely notifications that may prevent avoidable accidents. In addition, the strength of risk, and or number of moderate incident counts may be used for predicting accidents which may enable for personalized insurance premiums.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a thumb drive, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method comprising:
   determining, using a camera coupled to a first vehicle, a position of a second vehicle;
   determining that the second vehicle is about to enter a lane in which the first vehicle is traveling and that the first vehicle is driving faster than the second vehicle, causing a predicted risk based on a following distance that is shorter than a threshold distance;
   determining that a driver of the first vehicle performs a defensive driving action that is:
      responsive to the predicted risk;
      initiated prior to the driver being presented with any form of message regarding the predicted risk; and
      at least as safe as a typical driver in a same defensive driving scenario; and
   generating an alert notification based on the determination that the driver performed the defensive driving action, wherein the alert notification comprises an identification of the predicted risk based on the following distance that is shorter than the threshold distance and an identification of the defensive driving action that mitigated the predicted risk.

2. The computer implemented method of claim 1, further comprising:
   assessing an updated risk after the driver of the first vehicle performed the defensive driving action; and
   comparing the updated risk after the driver of the first vehicle performed the defensive driving action with the predicted risk had the driver not performed the defensive driving action.

3. The computer-implemented method of claim 1, wherein the defensive driving action includes slowing down the first vehicle or moving the first vehicle to a different lane.

4. The computer-implemented method of claim 1, wherein the defensive driving action includes slowing down the first vehicle within a time period leading up to or just after the second vehicle moved into the lane in which the first vehicle is traveling.

5. The computer-implemented method of claim 4, further comprising:
   determining that the distance between the first vehicle and the second vehicle has increased in the time period.

6. The computer-implemented method of claim 1, further comprising:
   determining that a following distance between the first vehicle and the second vehicle will be below a predetermined threshold if the second vehicle enters the lane in which the first vehicle is traveling.

7. The computer-implemented method of claim 1, further comprising:
   transmitting data to a remote device, wherein the data includes an inference that the driver performed the defensive driving action that mitigated risk.

8. The computer-implemented method of claim 7, wherein the data includes video data from the camera.

9. The computer-implemented method of claim 8, further comprising:
   training an autonomous vehicle driving system with the video data.

10. The computer-implemented method of claim 1, wherein the second vehicle is about to enter the lane in which the first vehicle is traveling from a merging lane of a highway.

11. A system comprising:
    at least one memory unit; and
    at least one processor coupled to the at least one memory unit, in which the at least one processor is configured to:
       determine, using a camera coupled to a first vehicle, a position of a second vehicle;
       determine that the second vehicle is about to enter a lane in which the first vehicle is traveling and that the first vehicle is driving faster than the second vehicle, causing a predicted risk based on a following distance that is shorter than a threshold distance;
       determine whether a driver of the first vehicle performs a defensive driving action that is:
          responsive to the predicted risk;
          initiated prior to the driver being presented with any form of message regarding the predicted risk; and
          at least as safe as a typical driver in a same defensive driving scenario; and
       generate an alert notification based on the determination that the driver performed the defensive driving action, wherein the alert notification comprises an identification of the predicted risk based on the following distance that is shorter than the threshold distance and an identification of the defensive driving action that mitigated the predicted risk.

12. The system of claim 11, wherein the at least one processor is further configured to:
assess an updated risk after the driver of the first vehicle performed the defensive driving action; and
compare the updated risk after the driver of the first vehicle performed the defensive driving action with the predicted risk had the driver not performed the defensive driving action.

13. The system of claim 11, wherein the defensive driving action includes slowing down the first vehicle or moving the first vehicle to a different lane.

14. The system of claim 11, wherein the at least one processor is further configured to:
transmitting data to a remote device, wherein the data includes an inference that the driver performed the defensive driving action that mitigated risk.

15. The system of claim 14, wherein the data includes video data from the camera, and wherein the at least one processor is further configured to:
train an autonomous vehicle driving system with the video data.

16. A machine-readable storage medium having computer-executable instructions stored thereon that, when executed by one or more processors, cause the one or more processors to perform operations comprising:
determining, using a camera coupled to a first vehicle, a position of a second vehicle;
determining that the second vehicle is about to enter a lane in which the first vehicle is traveling and that the first vehicle is driving faster than the second vehicle, causing a predicted risk based on a following distance that is shorter than a threshold distance;
determining whether a driver of the first vehicle performs a defensive driving action that is:
responsive to the predicted risk;
initiated prior to the driver being presented with any form of message regarding the predicted risk; and
at least as safe as a typical driver in a same defensive driving scenario; and
generating an alert notification based on the determination that the driver performed the defensive driving action, wherein the alert notification comprises an identification of the predicted risk based on the following distance that is shorter than the threshold distance and an identification of the defensive driving action that mitigated the predicted risk.

17. The machine-readable storage medium of claim 16, wherein the operations further comprise:
assessing an updated risk after the driver of the first vehicle performed the defensive driving action; and
comparing the updated risk after the driver of the first vehicle performed the defensive driving action with the predicted risk had the driver not performed the defensive driving action.

18. The machine-readable storage medium of claim 16, wherein the defensive driving action includes slowing down the first vehicle or moving the first vehicle to a different lane.

19. The machine-readable storage medium of claim 16, wherein the operations further comprise:
transmitting data to a remote device, wherein the data includes an inference that the driver performed the defensive driving action that mitigated risk.

20. The machine-readable storage medium of claim 19, wherein the data includes video data from the camera, and wherein the operations further comprise:
training an autonomous vehicle driving system with the video data.

* * * * *